US012539699B2

(12) United States Patent
Literski

(10) Patent No.: US 12,539,699 B2
(45) Date of Patent: Feb. 3, 2026

(54) SYSTEMS AND METHODS FOR AUTOMATICALLY CLEANING CONVERTERS WITH HEATED FLUIDS

(71) Applicant: Ecochem Australia Pty Ltd, Upper Plenty (AU)

(72) Inventor: Geoffrey Literski, Upper Plenty (AU)

(73) Assignee: ECOCHEM AUSTRALIA PTY LTD, Upper Plenty (AU)

( * ) Notice: Subject to any disclaimer, the term of this patent is extended or adjusted under 35 U.S.C. 154(b) by 0 days.

(21) Appl. No.: 17/905,162

(22) PCT Filed: Aug. 31, 2021

(86) PCT No.: PCT/AU2021/051009

§ 371 (c)(1),
(2) Date: Feb. 13, 2023

(87) PCT Pub. No.: WO2022/099346

PCT Pub. Date: May 19, 2022

(65) Prior Publication Data

US 2023/0123144 A1 Apr. 20, 2023

(30) Foreign Application Priority Data

Nov. 10, 2020 (AU) ................................ 2020904107
Aug. 25, 2021 (AU) ................................ 2021221846

(51) Int. Cl.
*B41F 35/00* (2006.01)
*B08B 3/08* (2006.01)
(Continued)

(52) U.S. Cl.
CPC ................ *B41F 35/00* (2013.01); *B08B 3/08* (2013.01); *B08B 3/10* (2013.01); *B08B 13/00* (2013.01);
(Continued)

(58) Field of Classification Search
CPC ........ B41F 35/00; B41F 35/001; B41F 35/04; B08B 3/08; B08B 3/10; B08B 13/00;
(Continued)

(56) References Cited

U.S. PATENT DOCUMENTS 9,873,139 B2 1/2018 Dudley et al.
2014/0216502 A1* 8/2014 Dudley ..................... B08B 3/04 134/98.1
2023/0123144 A1* 4/2023 Literski ..................... B08B 9/08 134/18

FOREIGN PATENT DOCUMENTS

AU 637135 B2 5/1993
AU 2021377723 B2 12/2022
(Continued)

OTHER PUBLICATIONS

JP 2003093992 (Year: 2003).*
(Continued)

*Primary Examiner* — Alexander Markoff
(74) *Attorney, Agent, or Firm* — Whitmyer IP Group LLC

(57) ABSTRACT

A method of cleaning a converter, the method including the steps of: providing a heating unit for heating a cleaning fluid; providing a ring main for continuous circulation of heated cleaning fluid around the ring main; connecting the heating unit to the ring main; connecting the ring main to the converter to enable delivery of heated cleaning fluid to the converter; and providing a controllable cleaning fluid valve for delivery of a heated cleaning fluid, and providing a controllable rinsing fluid valve for delivery of a rinsing fluid; providing a controller for controlled delivery of a sequence of the rinsing fluid and the heated cleaning fluid to the converter upon recognition of a rinsing fluid delivery condition and a heated cleaning fluid delivery condition, respectively.

18 Claims, 10 Drawing Sheets

(51) Int. Cl.
*B08B 3/10* (2006.01)
*B08B 13/00* (2006.01)
*B41L 41/00* (2006.01)

(52) U.S. Cl.
CPC ......... *B41L 41/00* (2013.01); *B08B 2203/007* (2013.01)

(58) Field of Classification Search
CPC ... B08B 2203/007; B08B 3/026; B08B 9/032; B08B 9/0323; B08B 9/08; B41L 41/00
See application file for complete search history.

(56) References Cited

FOREIGN PATENT DOCUMENTS

| | | | | |
|---|---|---|---|---|
| GB | 1539623 | A | 1/1979 | |
| JP | 2003093992 | A | 4/2003 | |
| WO | 2011037080 | A1 | 3/2011 | |
| WO | WO-2019213718 | A1 * | 11/2019 | ............. B08B 3/003 |
| WO | 2022099346 | A1 | 5/2022 | |

OTHER PUBLICATIONS

Australian Examination Report No. 1 and Search Report; Application No. 2021377723; Isued: Oct. 7, 2022; 5 Pages.
Canidian Office Action and Search Report; Application No. 3,168,773; Isued: Nov. 23, 2022; 4 Pages.
International Preliminary Report on Patentability, Chapter II; Application No. PCT/AU2021/051009; Isued: Jun. 7, 2022; 22 Pages.
International Search Report and Written Opinion of the International Searching Authority; Application No. PCT/AU2021/051009; Completed: Issued: Oct. 18, 2021; 9 pages.

* cited by examiner

SYSTEMS AND METHODS FOR AUTOMATICALLY CLEANING CONVERTERS WITH HEATED FLUIDS

RELATED APPLICATIONS

The present invention claims priority to Australian provisional patent application no. 2020904107 filed 10 Nov. 2020, and Australian standard patent application no. 2021221846 filed 25 Aug. 2021, and the entire content of each application is incorporated herein by reference.

TECHNICAL FIELD

The present invention relates to systems and methods for automatically cleaning converters, and in particular the invention relates to systems and methods for automatically cleaning converters by application of heated fluids to converter components.

The invention has been developed primarily for use with converters used in the manufacturing of corrugated boxes and will be described hereinafter with reference to that application. However, it will be appreciated that the invention is not limited to this particular field of use. For example, the invention may be used with bag or tissue printing machinery, or any other printing process that uses inks, and in particular water-based inks, and/or anilox rolls to transport the ink onto a printing plate that prints onto a medium.

BACKGROUND

In the industry of corrugated box manufacturing, or the printed material manufacturing industry more generally, the "converters" that manufacture printed material (for example, boxes) may comprise as part of their componentry printing machines for printing on materials that are assembled in the manufacturing process.

There is currently a large amount of waste in time, ink materials and/or equipment degradation due to the difficulty of maintaining clean converter components (particularly those components exposed to ink) at the same time as keeping up the speed of production and hence minimising the cost of production. There are also negative environmental consequences associated with wasted water or wasted cleaning solution, where more of those fluids than necessary are used during operation or cleaning of the converters. Furthermore, printing quality diminishes from substandard cleaning, the results of which can have significant commercial implications for manufacturers and those with interests in the finished product.

Typically, converter ink cleaning systems are largely manual, use up substantial labour resources and involve significant machine downtime. Consequently, many converters operate in a fouled state and print quality diminishes. Automatic converter ink cleaning systems may also require a significant amount of time to effectively clean converter components, which has commercial implications as discussed above and elsewhere in the specification. More recent converter ink cleaning systems, which apply rinsing and detergent cycles, are designed to receive a concentrated detergent manually and provide short wash cycles, and are thereby more difficult to administer, less effective and raise health and safety issues as detergents may be unsafe to handle (e.g., toxic, or highly flammable).

The inventor believes that the costs associated with one or more of the negative effects relating to inadequate cleaning and/or cleaning processes that are too time-consuming, remains underappreciated in the industry.

The present invention seeks to provide systems and methods of automatically cleaning converters using heated fluid, which will overcome or substantially ameliorate at least some of the deficiencies of the prior art, or to at least provide a useful alternative.

It is to be understood that, if any prior art information is referred to herein, such reference does not constitute an admission that the information forms part of the common general knowledge in the art, in Australia or any other country.

SUMMARY

According to a first aspect of the present invention, there is provided a method of cleaning a converter, the method including the steps of: providing a heating unit for heating a cleaning fluid; providing a ring main for fluid connection to the converter; connecting the heating unit to the ring main to enable continuous circulation of heated cleaning fluid around the ring main, and delivery of heated cleaning fluid to the converter; providing a controller for controlled delivery of the heated cleaning fluid to the converter.

Preferably, the ring main is positioned such that the heated cleaning fluid is deliverable to a cleanable part of the converter within a predetermined time after the controller recognises the heated cleaning fluid delivery condition. Preferably, the predetermined time is a range of time.

Preferably, the controller is adapted to provide controlled delivery of a rinsing fluid to the converter. Preferably, the rinsing fluid delivered subsequent to delivery of the cleaning fluid. Preferably, the rinsing fluid is not heated.

Preferably, the controller is adapted to provide controlled delivery of a sequence of heated cleaning fluid and rinsing fluid, to the converter.

It is intended that the term 'providing', as it is used above, and analogously in other areas of the specification, includes providing a new component, part or system, and/or applying or reconfiguring an existing, component, part or system, and/or retrofitting a component, part or system to an existing, component, part or system.

Preferably, the heating unit is adapted to heat the cleaning fluid to a temperature in the range of about 20 to about 70 degrees Celsius. In a preferred form, the heating unit is adapted to heat the cleaning fluid to a temperature in the range of about 20 to about 50 degrees Celsius. In a particularly preferred form, the heating unit is adapted to heat the cleaning fluid to a temperature in the range of about 35 to about 40 degrees Celsius.

It is preferred that the method includes the step of heating cleaning fluid in the heating unit to a temperature in the range of about 35 to about 40 degrees Celsius.

It is particularly preferred that the method includes the step of heating cleaning fluid in the heating unit to a temperature of about 40 degrees Celsius.

Preferably, the method includes the step of heating cleaning fluid in the heating unit to a temperature in the range of about 35 to about 40 degrees Celsius, where the cleaning fluid is to be conveyed by, or is for cleaning ink lines or other equipment that is made from temperature sensitive plastics or other temperature sensitive materials. Alternatively, a higher temperature range may be suitable where the cleanable component is not sensitive to higher temperatures, such as direct cleaning of an anilox roll, and such as where the heated cleaning fluid is separately conveyed to the anilox roll, ink tray, or other cleanable component, without passing through temperature sensitive the ink lines. If temperature sensitivity of the materials permits a higher temperature than 40 degrees, but nevertheless is suitable only below a specific maximum temperature (e.g., 45, 50, or 65 degrees), then that maximum temperature may be the preferred upper bound for heating of the cleaning fluid.

Preferably, the method includes the step of heating the cleaning fluid in the heating unit such that it is in the range of about 30 to 40 degrees when it is delivered to the converter. It is particularly preferred that the method includes the step of heating the cleaning fluid in the heating unit such that it is about 38 degrees when delivered to the converter (e.g., along the ink lines or at the anilox roll(s) of the converter).

Preferably, the temperature of the heated cleaning fluid is limited to about 35 or 40 degrees when the cleaning fluid is travelling through temperature sensitive internal piping that delivers ink.

Preferably, the method includes the step of positioning the ring main proximate to a boundary of the converter. Preferably, the method includes the step of positioning proximate to a boundary of the converter a manifold/controllable valves for fluid connection of the ring main and/or a rinsing fluid line (e.g., water line) to a fluid inlet of the converter, and for the control of fluid through said valves and to the converter. Preferably, positioning the ring main and/or manifold/controllable valves proximate to the boundary of the converter reduces a 'dead space' in the cleaning system (i.e., piping between the converter and the ring main/rinsing fluid line, or between the converter and the manifold/controllable valves, where heated cleaning fluid/rinsing fluid does not continuously circulate). The 'dead space' may also include piping between the boundary of the converter and the cleanable component of the converter, where the heated cleaning fluid/rinsing fluid does not continuously circulate.

Preferably, the ring main is fluidly connected to the manifold/controllable valves, and under pressure along a line up to the manifold/controllable valves, such that positioning the manifold/controllable valves close to the boundary of the converter minimises the 'dead space' in the cleaning system.

Preferably, upon recognising a cleaning initiation condition, controlled delivery of heated cleaning fluid/rinsing fluid to the converter is provided by the controller, and heated cleaning fluid/rinsing fluid flows through the 'dead space'.

Preferably, the method includes the step of positioning the ring main and/or manifold/controllable valves proximate to a boundary of the converter to reduce the 'dead time' that elapses between the controller recognising a cleaning initiation condition and the delivery of heated cleaning fluid or rinsing fluid into the converter (or delivery of heated cleaning fluid or rinsing fluid to a cleanable part of the converter).

Preferably, the controller is configured to deliver heated cleaning fluid from the ring main to the boundary of the converter within a range of about 1 second to about 30 seconds after occurrence of a cleaning initiation condition (or preferably within a range of about 1 second to about 10 seconds within a range of about 1 second to about 5 seconds after occurrence of a cleaning initiation condition. Longer 'dead times' may result due to the significant dimensions of converters, and significant spacing that may exist between multiple inlets of a converter that is serviced by a single line running from the ring main, and/or that is serviced by a single manifold. Where the controllable rinsing fluid valve is located at or within the boundary of the converter, and connected to a rinsing fluid line under pressure up to the controllable rinsing fluid valve, the delivery of rinsing fluid to the boundary may be continuous and not require the controller to recognise the rinsing fluid delivery condition for the rinsing fluid to be delivered to the boundary of or within the converter. As the cleanable part of the converter is not under a constant state of rinsing fluid delivery, even where the rinsing fluid valve is located proximate to the cleanable part there will be some time between the controller recognising the rinsing fluid delivery condition, however where rinsing fluid valve is located next to the cleanable part, delivery of rinsing fluid to the cleanable part may be effectively instantaneous. Similarly, the ring main may be separately piped into the converter, so that the ring main provides continuously circulated heated cleaning fluid to heated cleaning fluid valve a location that is proximate to the cleanable part.

Preferably, the controller is configured to deliver heated cleaning fluid from the ring main to a cleanable part of the converter within a range of about 1 second to about 60 seconds after occurrence of a cleaning initiation condition. In a preferred form, the controller is configured to deliver heated cleaning fluid from the ring main to a cleanable part of the converter within a range of about 1 second to about 30 seconds after occurrence of a cleaning initiation condition. It is particularly preferred that the controller is configured to deliver heated cleaning fluid from the ring main to a cleanable part of the converter within a range of about 1 second to about 15 seconds (or more preferably 10 seconds) after occurrence of a cleaning initiation condition.

Where the cleanable part of the converter is located further within the converter (e.g., the anilox roll), and the cleaning fluid/rinsing fluid must travel through a substantial length of piping to arrive at that cleanable part, the period of time for the delivery of the heated cleaning solution to said cleanable part further within the converter may be towards an upper end of the range. Where the cleanable part of the converter is located proximate to the boundary of the converter (e.g., the part of an ink line close to an ink line inlet on the converter), the period of time for the delivery of the heated cleaning fluid/rinsing fluid to said cleanable located proximate to the boundary of the converter may be towards a lower end of the range. Therefore, it will be understood that the 'dead space' or 'dead time' depends on which cleanable component is identified. By extension, and with reference to above description setting out the differing periods of time for the delivery of the cleaning fluid/rising fluid to the cleanable component, the 'dead space' between the ring main and/or manifold/controllable valves may be greater where the cleanable component is the anilox roll, and the 'dead space' is lesser where the cleanable component is the part of the ink line close to the ink line inlet on the converter.

Preferably, after occurrence of a cleaning initiation condition, an initial delivery of fluid (e.g., rinsing fluid, for example unheated water, or a combination of rinsing fluid and unheated cleaning fluid) is delivered to a cleanable part of the converter for a predetermined amount of time. Preferably, the predetermined amount of time is in a range of about 1 second to about 10 seconds. It is particularly preferred that the predetermined amount of time is in a range of about 2 seconds to about 8 seconds. It is preferred that the initial delivery of fluid pushes out an amount, and more preferably a substantial proportion, of the cleanable material (e.g., ink) in the lines in the converter.

Preferably, the initial delivery of fluid comprises delivery of a rinsing fluid. Preferably, the initially delivered rinsing fluid comprises a lower temperature fluid relative to the heated cleaning fluid (e.g., the rinsing fluid is an unheated fluid which is not circulated in the ring main, part or all of which rinsing fluid may be fluid in the manifold and/or 'dead space' from a previous cleaning cycle). Alternatively, after occurrence of a cleaning initiation condition, heated cleaning fluid may be delivered into the converter without prior delivery of rinsing fluid for a predetermined amount of time (e.g., there is no fluid in the 'dead space' between the ring main and the boundary of the converter and an initial rinsing fluid delivery is not provided). Preferably, where heated cleaning fluid is delivered without prior delivery of rinsing fluid for a predetermined amount of time, the controller delivers heated cleaning fluid to a boundary of the converter within a range of about 1 second to about 3 seconds. Preferably, where heated cleaning fluid is delivered to the converter without prior delivery of rinsing fluid for a predetermined amount of time, the controller delivers heated cleaning fluid to a cleanable part of the converter within a range of about 1 second to about 8 seconds (or fewer).

Preferably, the controller is configured to operate one or more controllable valves in response to the cleaning initiation condition.

Preferably, the method of the invention includes providing an outlet of rinsing and/or cleaning fluid, the outlet being connectable to a fluid inlet of the converter. Preferably, the fluid inlet is located at or near the boundary of the converter. Preferably, the fluid inlet is in fluid connection to a cleanable part of the converter. The fluid inlet may be exterior to the converter or inside the converter. The fluid inlet may be directly connected to a cleanable part (e.g., directly to a spray bar located near an anilox roll), or it may be indirectly connected to a cleanable part (e.g. to component such as a doctor blade, ink chamber, or fountain roller in an ink tray, that supplies ink to an anilox roll and/or via other cleanable parts such as the ink lines and ink pump).

It is preferred that the ring main and/or manifold/controllable valves is/are located proximate to a boundary of the converter, to provide a short piping path for the heated cleaning fluid/rising fluid between the ring main and/or manifold/controllable valves, and the fluid inlet of the converter. Preferably, the ring main is partially run overhead (i.e., in the space above each of the converters), and one or more line(s) are dropped down to each of the converters to be proximate to the boundary of each converter.

Preferably the short piping path has a length of less than about 10 meters. It is preferred that the short piping path has a length of less than about 5 meters. It is particularly preferred that the short piping path has a length between about 1 meter and about 3 meters.

Preferably, an internal piping path between the fluid inlet of the converter and the cleanable part of the converter (i.e., piping inside the boundary of the converter) has a length of less than about 3 to about 5 meters.

Preferably, the fluid inlet of the converter is a rinsing fluid line or an ink supply line.

Preferably, the fluid inlet of the converter is a rinsing fluid port or an ink supply port.

Preferably, after the cleaning initiation condition occurs, heated cleaning fluid travels from the ring main, along the short piping path between the ring main and the converter fluid inlet, and along the internal piping path within the converter between the fluid inlet and a cleanable part of the converter, within a range of about 5 to about 60 seconds (or, within a range of about 5 to about 30 seconds; or within a range of about 5 to about 15 seconds; or more particularly, within a range of about 5 seconds to about 10 seconds).

Preferably, the cleanable part comprises any one or more, or a combination of: an ink chamber of the converter; an ink line of the converter; an anilox roll of the converter; an ink pump; and/or a tray of the converter.

The cleanable part of the converter may comprise any one or more, or a combination of: a printing cylinder of the converter; a fluid line of the converter; and/or a valve of the converter.

Preferably, the converter is connected to a rinsing fluid line for supplying the rinsing fluid to the converter. The rinsing fluid line may be an existing rinsing fluid line that is connected to the converter. The existing rinsing fluid line is preferably connected to the manifold/controllable rinsing valve. Alternatively, a new rinsing fluid line may be installed, or another rinsing line not already connected to the converter may be utilised, and connected to the manifold/rinsing valve.

Preferably, the method includes providing an automatically controllable cleaning fluid valve for delivering the heated cleaning fluid from the ring main to the converter.

Preferably, the automatically controllable heated cleaning fluid valve, when activated, delivers heated cleaning fluid from the ring main to the boundary of the converter within about 1 to about 30, or 15, or 10 or 5 seconds.

Preferably, the automatically controllable heated cleaning fluid valve, when activated, delivers heated cleaning fluid from the ring main, through the heated cleaning fluid valve, along the short piping path between the ring main and the converter fluid inlet, and along the length of piping within the converter between the fluid inlet and a cleanable part of the converter (e.g. an anilox roll) within about 5 (or fewer) seconds up to about 60 seconds (or, preferably, within about 5 (or fewer) seconds up to about 30 seconds; or preferably, within about 5 (or fewer) seconds up to about 15 seconds; or, preferably within about 5 (or fewer) seconds up to about 10 seconds; or preferably, within about 5 (or fewer) seconds up to about 8 seconds).

Preferably, the method includes providing an automatically controllable rinsing fluid valve for delivering the rinsing fluid to the converter.

Preferably, the automatically controllable rinsing fluid valve, when activated, delivers heated rinsing to the boundary of the converter within about 1 to about 30, or 15, or 10 or 5 seconds.

Preferably, the automatically controllable rinsing fluid valve, when activated, delivers rinsing fluid through the rinsing fluid valve, and along the length of piping within the converter between the fluid inlet and a cleanable part of the converter, within about 5 (or fewer) seconds up to about 60 seconds (or, preferably, within about 5 (or fewer) seconds up to about 30 seconds; or preferably, within about 5 (or fewer) seconds up to about 15 seconds; or, preferably within about 5 (or fewer) seconds up to about 10 seconds; or preferably, within about 5 (or fewer) seconds up to about 8 seconds).

Preferably, the method includes the step of providing a manifold for fluid connection of each of the ring main and a rinsing fluid line (e.g., water line) to the fluid inlet of the converter.

Preferably, the manifold is located proximate to the boundary of the converter.

The manifold may be wholly located exterior to the converter, partly exterior to and partly inside the converter, or wholly inside the converter.

Preferably, the manifold is located proximate to the boundary of the converter to provide a short piping path for the heated cleaning fluid/rinsing fluid between the manifold and the fluid inlet of the converter.

Preferably, the manifold includes the automatically controllable cleaning fluid valve and/or rinsing fluid valve.

The manifold may include one or more components inside the converter. In a preferred form, the manifold includes existing automatically controllable valves within the converter, which operate as one or more of the automatically controllable cleaning fluid valve and/or the rinsing valve. In some arrangements, providing the manifold may include providing fluid connections to one or more existing automatically controllable valves within the converter (e.g., connecting the rinsing fluid line to a first existing automatically controllable valve, and/or connecting the ring main to a second existing automatically controllable valve).

Preferably valves comprise solenoid valves. Alternatively, the valves may be any automatically controllable valve known to the skilled addressee.

In a preferred form, the manifold includes a dual inlet solenoid valve, and an output with fluid connection to the inlet of the converter. Preferably, when the manifold comprises a dual inlet valve, a first inlet of the dual inlet solenoid valve has fluid connection to the ring main and a second inlet of the dual inlet solenoid valve has fluid connection to the rinsing fluid line.

In a preferred alternative form, the manifold includes a Y or T junction, and an output with fluid connection to the inlet of the converter. Preferably, when the manifold comprises a Y or T junction, a first inlet of the Y or T junction has fluid connection to the ring main and a second inlet of the Y or T junction has fluid connection to the rinsing fluid line.

It is preferred that the cleaning fluid valve and/or rinsing fluid valve is located upstream of the respective first inlet and second inlet of the Y or T junction.

Preferably, controlled delivery of the heated cleaning fluid and the rinsing fluid to the converter includes alternating and/or timed delivery of heated cleaning fluid and rinsing fluid.

The alternating timed delivery may comprise a first timed delivery of heated cleaning fluid and then a second timed delivery of rinsing fluid. The length of the alternating and/or timed delivery of heated cleaning fluid and rinsing fluid may be between about 1 minute and about 40 minutes. Preferably, the length of the alternating and/or timed delivery of heated cleaning fluid and rinsing fluid is between about 2 minutes and about 20 minutes.

Longer alternating and/or timed delivery sequences (e.g. about 10 minutes or longer) may be suitable for print systems that run continuously for more than one day, or for up to or more than a week, (e.g. preprint plants or bag plants) and where longer periods of cleaning and/or rinsing delivery are needed to clean material (e.g. ink) that has dried and/or built-up on the cleanable component (e.g. anilox rolls) over a longer period of time.

The alternative timed delivery may comprise a cycle in which approximately half of the length of the cycle comprises timed delivery of heated cleaning fluid, and half of the length of the cycle comprises timed delivery of rinsing fluid. Alternatively, there may be a greater relative period of timed delivery of the heated cleaning solution compared to the rinsing fluid (or vice-versa, a greater relative period of timed delivery of the rinsing fluid compared to the heated cleaning solution).

According to a preferred cleaning method, alternating timed delivery lasts for approximately two to four minutes, and comprises:

a) A first rinse, delivering in the range of about 2 or 5 seconds to about 15 (or fewer) seconds of rinsing fluid;
b) delivery of heated cleaning fluid for a period in the range of about 50 seconds to about 90 seconds; then
c) a second rinse, delivering in the range of about 40 seconds to 90 seconds of rinsing fluid.

According to a further preferred cleaning method, alternating timed delivery lasts for approximately two or three minutes, and comprises:

a) A first rinse in the range of about 2 or 3 seconds to about 15 (or fewer) seconds of rinsing fluid;
b) in the range of about 50 seconds to about 70 seconds of heated cleaning fluid; then
c) a second rinse in the range of about 40 seconds to 80 seconds of rinsing fluid.

According to a preferred cleaning method, alternating timed delivery lasts for approximately two minutes, and comprises a) A first rinse in the range of about 2 or 3 seconds to about 5 seconds of rinsing fluid;
b) about 60 seconds of heated cleaning fluid; then
c) a second rinse of about 60 seconds of rinsing fluid.

According to a further preferred cleaning method, alternating timed delivery lasts for approximately three or four minutes, and comprises:

a) A first rinse in the range of about 3 seconds to about 15 (or fewer) seconds of rinsing fluid;
b) in the range of about 80 second to about 100 seconds of heated cleaning fluid; then
c) a second rinse in the range of about 80 to 140 seconds of rinsing fluid.

According to a preferred cleaning method, alternating timed delivery lasts for approximately three and a half minutes, and comprises a) A first rinse in the range of about 3 seconds to about 15 seconds of rinsing fluid;
b) about 90 seconds of heated cleaning fluid; then
c) a second rinse of about 120 seconds of rinsing fluid.

According to a further preferred cleaning method, alternating timed delivery lasts for approximately four to six minutes, and comprises:

a) A first rinse in the range of about 3 seconds to about 15 seconds of rinsing fluid;
b) in the range of about 100 seconds to about 160 seconds of heated cleaning fluid; then
c) a second rinse in the range of about 140 to 200 seconds of rinsing fluid.

According to a preferred cleaning method, alternating timed delivery lasts for approximately six minutes, and comprises a) A first rinse in the range of about 3 seconds to about 15 seconds of rinsing fluid;
b) about 180 seconds of heated cleaning fluid; then
c) a second rinse of about 180 seconds of rinsing fluid.

According to a further preferred cleaning method, alternating timed delivery lasts for approximately six to nine minutes, and comprises:

a) A first rinse in the range of about 3 seconds to about 15 seconds of rinsing fluid;
b) about 160 seconds to about 280 seconds of heated cleaning fluid; then
c) a second rinse of about 200 seconds to about 280 seconds of rinsing fluid.

According to a preferred cleaning method, alternating timed delivery lasts for approximately eight minutes, and comprises a) A first rinse in the range of about 3 seconds to about 15 seconds of rinsing fluid;
b) about 240 seconds of heated cleaning fluid; then c) a second rinse of about 240 seconds of rinsing fluid.

According to a further preferred cleaning method, alternating timed delivery lasts for approximately nine to eleven minutes, and comprises:

a) A first rinse in the range of about 3 seconds to about 15 seconds of rinsing fluid;

b) about 270 seconds to about 330 seconds of heated cleaning fluid; then c) a second rinse of about 270 seconds to about 330 seconds of rinsing fluid.

According to a preferred cleaning method, alternating timed delivery lasts for approximately ten minutes, and comprises a) A first rinse in the range of about 3 seconds to about 15 seconds of rinsing fluid;

b) about 300 seconds of heated cleaning fluid; then c) a second rinse of about 300 seconds of rinsing fluid.

It will be appreciated by the skilled addressee that cleaning cycles of varying lengths are designed to be appropriate to the size and/or cleaning state of the converter to be cleaned (and more particularly the cleanable part(s) of the converter that need cleaning), and the converter cleaning schedule (i.e. how regularly the converter is cleaned).

The first delivery of rinsing fluid may be delivered by activation of the rinsing fluid valve to deliver rinsing fluid from the rinsing fluid source to the converter.

Alternatively, the first delivery of rinsing fluid may be obtained by activation of the heated cleaning fluid valve to 'flush out' (or fluid push) rinsing fluid in converter and/or manifold piping from a previous cycle that ended with delivery of rinsing fluid. In such cycles of controlled delivery, only two valve activations may be necessary per cycle (i.e., one activation of the heated cleaning fluid valve and one activation of the rinsing fluid valve) and the amount of rinsing fluid that is delivered in a first delivery to the cleanable parts of the converter is limited to the amount of rinsing fluid that remains in converter and/or manifold piping from the previous cycle. Optionally, piping internal and/or external to the converter, and/or a small supplementary fluid reservoir, may be arranged or modified to ensure that an appropriate amount of first delivery of rinsing fluid can be delivered to the cleanable parts of the converter before application of the heated cleaning fluid (i.e., sufficient to deliver about 2 to about 5 seconds of an initial rinse). For example, where the manifold comprises a dual inlet valve for receiving heated cleaning fluid and rinsing fluid, the piping between the outlet of the dual inlet valve and the cleanable part of the converter may be sized to provide a sufficient amount of rinsing fluid for the first delivery of rinsing fluid.

It will be appreciated by the skilled addressee that a first delivery of rinsing fluid is preferable to enhance alternating delivery cleaning methods. This may be, for example, to improve efficiency by using a relatively less scarce resource (i.e., rinsing fluid) prior to using the more scarce resource (i.e. cleaning fluid), where that less scarce resource offers some initial cleaning benefits by flushing out some of the material to be cleaned (e.g. ink). While an initial application of cleaning fluid would work to clean lines or cleanable components exposed to the cleanable material (e.g. in a cycle without an initial delivery of rinsing fluid, which is contemplated to fall within the scope of the invention), improvements in cleaning efficiency may be obtained with an initial short rinse of rinsing fluid to push out or remove the cleanable material (e.g. ink) in the converter lines and/or on other cleanable parts exposed to the cleanable material so that such cleanable parts are partially cleaned prior to application of the cleaning fluid.

As a further alternative, however, where there is no substantial difference in the scarcity of each of the fluid resources (e.g. the cost of cleaning fluid is not substantially greater than the cost of the rinsing fluid), the initial delivery of fluid may comprise initial delivery of heated cleaning fluid without, or substantially without, prior application of another fluid (e.g. where the piping is set up to drain the short piping path between the ring main and the fluid inlet of the converter after each cycle, or where a small amount of unheated cleaning fluid remaining in the cleaning system lines from a previous cleaning cycle is 'flushed out' by the subsequent cycle). Preferably, initial delivery of heated cleaning fluid comprises delivery of heated cleaning fluid to a boundary of the converter within about 1 second from opening of the automatically controllable heated cleaning fluid valve. Preferably, initial delivery of heated cleaning fluid comprises delivery of heated cleaning fluid to a cleanable part of the converted within a range of about 2 seconds to about 5 seconds from opening of the automatically controllable heated cleaning fluid valve.

Preferably, the rinsing fluid is water. The rinsing fluid may comprise a mixture of rinsing fluid (e.g., water) and cleaning fluid, for example, where there is some mixing downstream of the manifold of cleaning fluid and rinsing fluid from a previous cycle.

Preferably, the cleaning fluid is a diluted cleaning fluid comprising a cleaning fluid and a diluting liquid (e.g., water).

Preferably, the heating unit is a heat exchanger (for example, a tube and shell heat exchanger, or a plate heat exchanger). It will be understood by the skilled addressee that other heating units suitable for the environment may be applied (for example, those not exposing the environment to any flames or dangerously high temperatures, as the manufacture of printed material and/or cardboard boxes involves the use of various combustible or flammable materials such as ink and paper, and those that achieve heating of the cleaning fluid without causing damage or substantially reducing the efficacy of the cleaning fluid).

The heating unit is preferably adapted to maintain the heated cleaning fluid solution at or around a determined elevated temperature substantially along the length of the ring main. Preferably, where the ring main is for use with more than about five or six converters, the method includes providing two or more heating units connected to the ring main, to enable delivery of heated cleaning fluid in or around the preferred range of temperatures.

Preferably, the rinsing fluid line is fluidly connected to a rinsing fluid source. Preferably, the rinsing fluid source comprises a mains water source. Alternatively, the rinsing fluid source may be an on site bulk container containing rinsing fluid.

Preferably, the heating unit is connected to a cleaning fluid source and a heat exchange liquid source which, when heated, provides for heat exchange in the heating unit. Preferably, the heating unit liquid source is the rinsing fluid source.

Preferably the cleaning fluid is diluted with a diluting fluid. Preferably, the cleaning fluid is diluted prior to heating in the heating unit.

Preferably, the method includes providing a diluter for diluting the cleaning fluid with the diluting fluid.

Preferably, the cleaning fluid source is connected, via the diluter, to a diluting fluid source. Preferably, the diluter is for mixing a fixed or variable proportion of cleaning fluid with the diluting fluid. Preferably, the dilutor is a hydraulic dosing/injecting device. Preferably, the diluter is a venturi mixing valve.

Preferably, the heating unit has a direct connection to the rinsing fluid source to provide the heating unit liquid.

Preferably, the diluting fluid and the rinsing fluid is water. Preferably, the heat exchange liquid is water.

Preferably, the diluting fluid source and the rinsing fluid source are the same fluid source.

Preferably, the diluting fluid source, the rinsing fluid source and the heating unit liquid source are the same source.

Preferably that same fluid/liquid source is a mains water source.

Preferably, the method includes the step of connecting one or more manual cleaning fluid applicators (e.g., one or more sprayers connected to a hose reel) to the ring main for manual application of heated cleaning fluid to components of the converter and/or equipment used with the converter (e.g., to clean a stereo printing plate or mat, a tray, ink hutches on the converter, and/or other external parts of the converter or related equipment). Preferably, equipment that is cleaned manually is such that the cleaning fluid is applied to a lower surface of the equipment before an upper surface of the equipment.

The one or more manual sprayers preferably comprise a high-pressure control applicator (for example, an applicator gun similar to those conventionally used for washing vehicles). The manual sprayer preferably includes an air inlet to suck air, and the air is combined with the fluid flowing through the sprayer and forced through a sieve (or a plurality of sieves) such that when the diluted cleaning fluid exits the sprayer it comprises a foamed diluted cleaning fluid. The foamed cleaning fluid provides for increased contact time on the converter components and/or equipment as the foamed cleaning fluid is able to remain on the relevant cleanable component/equipment longer than would be the case if the cleaning fluid was in liquid form. The foamed cleaning fluid also provides persons applying the cleaning fluid a visual indication of where it has been applied, and thereby improved manual cleaning.

The method preferably includes providing, near or at the converter, a tap connected to the ring main for manual access of the heated cleaning solution.

Preferably, the method includes providing a circulation pump for circulating the heated cleaning fluid around the ring main. Preferably, the circulation pump is controllable to be inactivated for a predetermined period of time. It is preferred that the predetermined period of time is at least 2 to 4 hours per 24 hours. It is particularly preferred that the predetermined period of time is at least 4 hours per 24 hours.

Preferably, the method includes providing two (or more) circulation pumps, preferably in line along the ring main, so that each pump runs for alternating 12-hour (or shorter, or longer) blocks of time. Preferably, providing two or more circulation pumps provides for continuous circulation of heated cleaning fluid around the ring main for an extended period of time (e.g., one day, one week, or one month).

Preferably, the controller is able to control delivery of the heated cleaning fluid, the rinsing fluid and the circulation pump(s).

Preferably, the method includes providing one or more isolation valves to isolate one or more of the following: the heat exchange unit; the ring main; the cleaning fluid source; circulation pump(s); manual cleaning fluid applicator(s) connected to the ring main; a valve of the converter; or other components of the converter.

Preferably, the method includes providing one or more isolation valves to isolate each of a plurality of printdowns within the converter. It is preferred that the method permits cleaning of one or more printdowns at a time, without interrupting operation of the printdowns that are not being cleaned.

Preferably, method and/or system provides an excess and/or partly redundant number of isolation and/or non-return valves. Preferably, the isolation and non-return valves are able to prevent back flow and cross contamination of heating and/or rinsing fluid if a controllable valve fails open and also to be able to isolate equipment without having to stop all the cleaning system Preferably, the heating unit includes an outlet for introducing heated cleaning fluid into the ring main and an inlet for receiving cleaning fluid that has circulated around the ring main.

Preferably, the heating unit inlet is connectable to a cleaning fluid source. It is preferred that the cleaning fluid source comprises a container of concentrated cleaning fluid, the container in fluid connection to a diluter for diluting the concentrated cleaning fluid with a diluting fluid. Preferably the container is an IBC tank. Preferably the container is an approximately 1000 L (or 264 Gallon) container. Alternatively, smaller containers may be used (e.g., 200 L, or 55 Gallon containers).

Preferably, the method includes providing a flow measuring unit (e.g., a flow meter) connected on the container or between the container and the diluter to measure usage of the concentrated cleaning fluid. In a preferred form, the flow measuring unit comprises a volumetric flow meter. Preferably the flow measuring unit includes communication circuitry to wirelessly communicate flow related data to the controller and/or a personal electronic computer. Preferably, the flow measuring unit includes data/event logging. Events comprising flow rates or refilling of the container may be time stamped and recorded in the unit. This data can be accessed as a report by way of SD card, cable, Bluetooth, or WiFi. This function will be managed by a microcontroller and either built-in peripherals or by a dedicated Bluetooth or WiFi controller/module. Where data/event logging is provided, the flow measuring unit may include additional memory storage and an external real time clock.

Preferably, the ring main is insulated, at least, up to and including a region proximate to a final converter of a plurality of converters to which the ring main is connected.

Preferably, the ring main is made from copper or a copper alloy. Alternatively, the material may be reinforced PEX piping, or stainless steel, or other materials known to the skilled addressee.

Preferably, the ring main includes a plurality of pieces with flanged joints for connection of one piece to another.

Preferably, the ring main comprises a 1 inch/25 mm (internal diameter) line. Alternatively, the line may be ⅜ inch, % inch, % inch, 1.25 inch, or 1.5 inch lines.

Preferably, the manifold includes a 1 inch/25 mm lines (internal diameter). Alternatively, the lines may be ⅜ inch, % inch, % inch, 1.25 inch, or 1.5 inch lines.

Preferably the controller comprises a programmable logic (PLC) controller. Alternatively, it may comprise a personal computer. Preferably the controller is duplicated on each print station and/or set up so that delivery of cleaning fluid and rinsing fluid to each printdown can be separately controlled.

The controller may be a separately installed controller (i.e., separate to the converter controller) for controlling delivery of the rinsing and cleaning fluid on existing converters (or as part of new converter installation). Alternatively, the controller may be a reconfigured existing computer for controlling wash up cycles on an existing converter. In such an arrangement, existing cleaning cycles delivered by the existing computer (i.e., that do not provide alternating timed delivery) may be modified to provide the cleaning method of the invention described herein.

In a second aspect of the invention, there is provided a method for cleaning a plurality of converters, the method including the steps of: providing a heating unit for heating a cleaning fluid; providing a ring main for fluid connection to each of the plurality of converters; connecting the heating unit to the ring main to enable continuous circulation of the heated cleaning fluid around the ring main, and delivery of the heated cleaning fluid to each of the plurality of converters; and providing a controller for controlled delivery of the heated cleaning fluid to each of the plurality of converters.

Preferably, the controller is configured to provide controlled delivery of a rinsing fluid to each of the plurality of converters.

Preferably, the method includes the step of positioning the ring main and/or manifold/controllable valves proximate to a boundary of each of the plurality of converters to reduce the 'dead time' before which the controller can deliver heated cleaning delivery into each of the plurality of converters.

Preferably, the method includes the step of positioning the ring main proximate to a boundary of each of the plurality of converter to reduce the 'dead space' in the cleaning system (e.g., piping between the ring main and each of the plurality of converters where heated cleaning fluid does not continuously circulate).

Preferably, the controller is able to operate one or more valves associated with each of the plurality of converters to deliver heated cleaning fluid from the ring main to a cleanable part of each of the respective plurality of converters within a period of time in a range between about 5 (or fewer) second to about 60 (or 30, or 15, or 10) seconds of occurrence of a respective cleaning initiation condition.

Preferably, the ring main is located proximate to a boundary of each of the plurality of converters, to provide a short piping path for the heated cleaning fluid between the ring main and a fluid inlet at or near the boundary of each of the plurality of converters.

Preferably, after the cleaning initiation condition occurs for a particular converter (or a particular cleanable part of the particular converter) in a plurality of converters, heated cleaning fluid travels from the ring main, along the short piping path between the ring main and the particular converter fluid inlet of the converter, and along a length of piping within the particular converter between the fluid inlet and the particular cleanable part of the converter, within a period of time in a range between about 5 (or fewer) seconds to about 15 (or 30, or 60) seconds.

Preferably, each of the plurality of converters is connected to a rinsing fluid line for supplying the rinsing fluid to each converter.

In a third aspect of the invention, there is provided a system of cleaning a converter, the system including: a ring main for fluid connection to the converter; a heating unit for heating a cleaning fluid, the heating unit being connectable to the ring main to enable continuous circulation of heated cleaning fluid around the ring main, and delivery of the heated cleaning fluid to the converter; and a controller configured to provide controlled delivery of the heated cleaning fluid to the converter.

Preferably, the controller is configured to provide controlled delivery of a rinsing fluid to the converter.

Preferably, the heating unit is adapted to heat the cleaning fluid to a temperature in a range of about 30 to about 55 degrees. It is preferred that the heating unit is adapted to heat the cleaning fluid to a temperature in a range of about 30 to about 40 degrees. It is particularly preferred that the heating unit is adapted to heat the cleaning fluid to a temperature of about 40 degrees.

According to a fourth aspect, there is provided a system of cleaning a plurality of converters, the system including: a ring main for fluid connection to each of the plurality of converters; a heating unit for heating a cleaning fluid, the heating unit being connectable to the ring main to enable continuous circulation of heated cleaning fluid around the ring main, and delivery of the heated cleaning fluid to each of the plurality of converters; and a controller able for controlled delivery of the heated cleaning fluid to each of the plurality of converters.

Preferably, the controller is configured to provide controlled delivery of a rinsing fluid to the converter to each of the plurality of converters.

According to a fifth aspect of the invention, there is provided a method of cleaning a converter, the method including the steps of: providing a heating unit for heating a cleaning fluid; providing a ring main for continuous circulation of heated cleaning fluid around the ring main; connecting the heating unit to the ring main; connecting the ring main to the converter to enable delivery of heated cleaning fluid to the converter; providing a controller for controlled delivery of a sequence of a rinsing fluid and the heated cleaning fluid to the converter upon recognition of a rinsing fluid condition and a heated cleaning fluid delivery condition, respectively; providing a controllable cleaning fluid valve for delivery of the heated cleaning fluid, and providing a controllable rinsing fluid valve for delivery of the rinsing fluid.

Preferably, the ring main is positioned such that the heated cleaning fluid or rinsing fluid is deliverable to a cleanable part of the converter within a predetermined time after the controller recognises the heated cleaning fluid delivery condition and the rinsing fluid delivery condition, respectively.

Preferably, the sequence of rinsing fluid and heated cleaning fluid is delivered upon recognition by the controller of a cleaning initiation condition.

Preferably, the ring main is positioned to be proximate to a boundary of the converter.

Preferably, the controllable cleaning fluid valve and/or the controllable rinsing fluid valve are positioned to be proximate to a boundary of the converter.

Preferably, the controller enables delivery of heated cleaning fluid and rinsing fluid to a boundary of the converter within a respective predetermined time after the controller recognises the heated cleaning fluid delivery condition and the rinsing fluid delivery condition. Preferably, the controllable heated cleaning fluid valve and the controllable rinsing fluid valve comprise a single controllable valve.

Preferably, the controller is configured to: deliver heated cleaning fluid from the ring main to a boundary of the converter within a range of about 1 second to about 10 seconds after occurrence of the cleaning fluid delivery condition; and/or deliver rinsing fluid from a rinsing line to a boundary of the converter within a range of about 1 second to about 10 seconds after occurrence of the rinsing fluid delivery condition.

Preferably, wherein the controller is configured to: deliver heated cleaning fluid from the ring main to the cleanable part of the converter within a range of about 1 second to about 20 seconds after occurrence of the cleaning fluid delivery condition; and/or deliver rinsing fluid to a cleanable part of the converter within a range of about 1 second to about 20 seconds after occurrence of the rinsing fluid delivery condition.

Preferably, after occurrence of a cleaning initiation condition, the controller is able to operate the controllable rinsing fluid valve to provide an initial delivery of rinsing fluid to the cleanable part of the converter for about 2 seconds to about 4 seconds.

Preferably, delivery of cleaning and rinsing fluid includes delivery to a fluid inlet of the converter at or near the boundary of the converter, the fluid inlet being in fluid connection to a cleanable part of the converter.

Preferably, the fluid inlet is a rinsing fluid and cleaning fluid inlet that is able to receive both heated cleaning fluid from the ring main and rinsing fluid from a rinsing fluid source.

Preferably, the fluid inlet of the converter is a rinsing fluid line or rinsing fluid port of the converter, or an ink supply line or ink supply port of the converter.

Preferably, controlled delivery of the heated cleaning fluid and the rinsing fluid to the converter includes alternating timed delivery of heated cleaning fluid and rinsing fluid.

Preferably, the method and/or system of the invention may comprise retrofit system, using one or more of, or a combination of the following existing components: a valve, a manifold, a fluid line and/or a controller, connected to or part of an existing converter.

Preferably, the method and/or system of the invention comprises application of one or more existing converter components (for example, one or more existing automatically controllable valves in an existing converter, and an existing controller, which valves, and controller are able to be reconfigured to perform the method or system of the invention). It is particularly preferred that the invention includes repurposing and/or reconfiguring one or more existing valves able to deliver an existing washing up cycle on an existing converter, such that the one or more valves are connected to the ring main and therefrom deliver heated cleaning solution to the cleanable components. It is further particularly preferred that the invention includes repurposing and/or reconfiguring an existing controller of an existing controller to provide the timed alternating delivery of heated cleaning fluid and rinsing fluid in accordance with the invention.

Other aspects of the invention are also disclosed.

The features described in relation to one or more aspects of the invention are to be understood as applicable to other aspects of the invention. More generally, combinations of the steps or features of any of the methods of the invention and/or the features of any of the systems of the invention described elsewhere in this specification, including in the claims, are to be understood as falling within the scope of the disclosure of this specification.

BRIEF DESCRIPTION OF THE DRAWINGS

Notwithstanding any other forms which may fall within the scope of the present invention, preferred embodiments of the invention will now be described, by way of example only, with reference to the accompanying drawings in which.

DETAILED DESCRIPTION OF EMBODIMENTS

Figure 1:
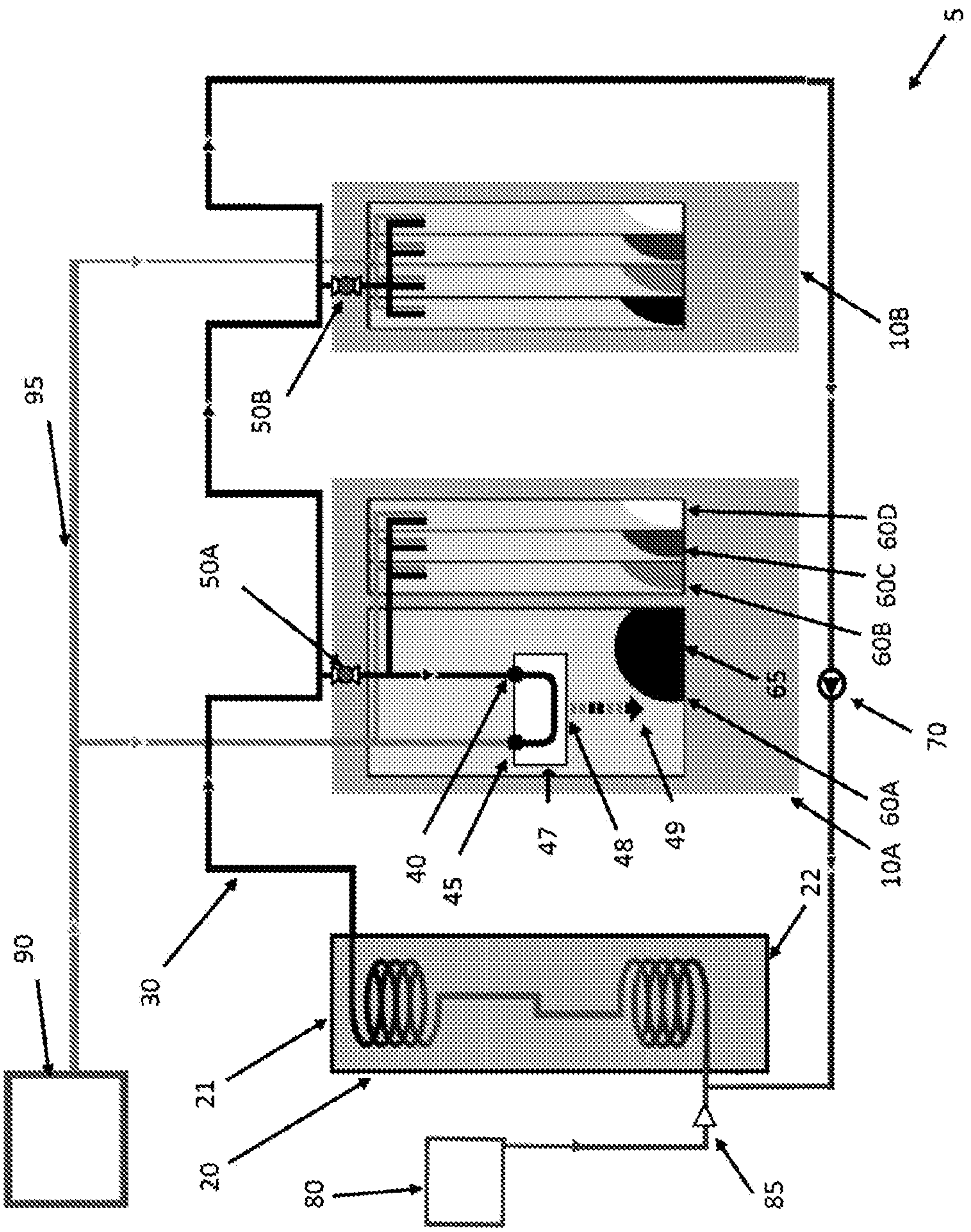
FIG. 1 is a schematic illustration of a system for cleaning a converter in accordance with a preferred embodiment of the present invention.

It should be noted in the following description that like or the same reference numerals in different embodiments denote the same or similar features.

FIG. 1 depicts a system 5 for cleaning two converters, 10A and 10B. The system 5 includes a heating unit 20, comprising a heat exchanger including a coiled tube though which the cleaning fluid is able to flow, and, in this way, controlled heating may be effected. In particular, the coiled tube in the heat exchanger is surrounded by a fluid (water) having an elevated temperature (approximately 100 degrees Celsius). The cleaning fluid is run through the coiled tube and in this way is indirectly heated. It will be appreciated by the skilled addressee that such heat exchange unis keep the cleaning fluid separate to the surrounding heat exchange liquid (i.e. the shell side fluid), and this arrangement is used in preference to a heating element type heating unit as the cleaning fluid can deposit on the heating element and that in turn reduces the effect of the cleaning fluid, as well as causing the heating element to burn out. In particular, where the cleaning fluid includes components that are particularly sensitive to temperature, such as enzymes, the heat exchanger set up as depicted in FIG. 1 is configured to minimise the damage to such components (e.g., denaturing the enzymes) as they are not in direct contact with any high temperature heating component (e.g., a heating element). The proposed heat exchange unit arrangement also minimises fire hazards or related risks that may occur in the context of a printed material or box manufacturing plant where a naked flame or exposed high temperature heating elements can be a substantial risk due to surrounding combustible or flammable materials.

The ring main 30, is connected to the heating unit 20 via an outlet at a first end 21 such that heated cleaning fluid enters into the ring main 30, and can circulate around the length of the ring main 30, to re-enter at an inlet near a second end 22 of the heating unit 20, where it can be re-heated. The circulation of heated cleaning fluid is maintained using the circulation pump 70.

The ring main 30 is connected to each of the converters, 10A and 10B, via an isolation valve 50A, and 50B, respectively. It is noted that only one isolation valve for each converter is depicted in FIG. 1, however, in practice the ring main would be isolated from each of the printdowns 60A, 60B, 60C and 60D by separate isolation valves, so that each printdown could be separately cleaned (i.e., permitting continuous running of one or more printdowns while one or more other printdowns were being cleaned).

The ring main 30 is also connected to a t-valve which connects a cleaning fluid source 80 to the heating unit 20. The fluid line connecting the fluid source 80 to the heating unit 20 includes a chemically resistant non-return valve 85 to maintain the volume of cleaning fluid flowing around the ring main 30. In this way, the total volume of the cleaning fluid in the ring main 30 and heating unit 20 remains reasonably constant, as it is topped up from the cleaning fluid source 80 when cleaning fluid is delivered to the converters 10A, 10B.

The ring main 30 is positioned proximate to a boundary of the converter to reduce the 'dead time' prior to heated cleaning fluid delivery (i.e., the time before which the controller can deliver heated cleaning fluid into the converter).

The heating unit 20 is adapted to heat the cleaning fluid to a temperature of approximately 40 degrees Celsius, so that it can be circulated around the ring main 30 at or around this temperature. The ring main 30 comprises a plurality of connected flanged copper pieces, and is insulated to minimise loss of heat of the heated cleaning fluid as it travels around the ring main 30.

The system 5 further includes a controller (not shown) that controls delivery of heated cleaning fluid into converter 10A using solenoid valve 40 for controlling flow of the heating cleaning fluid through the manifold 47 and into the converter (and in particular to the anilox roll 65 of the converter 10A, though the cleaning fluid will travel to other cleanable parts of the converter such as the ink lines, and ink chamber, as part of this process).

The ring main 30 is connected to the manifold 47 located at the boundary of the converter 10A, via a downpipe that extends from the ring main 30 to a manifold 47. The manifold 47 may alternatively be located inside the converter 10A.

The manifold 47 includes a dual inlet valve including a cleaning fluid solenoid valve 40 and, a rinsing fluid solenoid valve 45 and an output 48 that is in fluid connection to the fluid inlet 49 of the first printdown 60A of converter 10A, wherein a first inlet of the dual inlet valve (located adjacent to the cleaning fluid solenoid valve 40) is in fluid connection to the ring main 30, via isolation valve 50A and a second inlet of the dual inlet valve (located adjacent to the rinsing fluid solenoid valve 45) is in fluid connection to the rinsing fluid line 95.

The controller controls delivery of rinsing fluid via rinsing fluid line 95 from rinsing fluid source 90 (i.e., mains water supply), by selectively activating solenoid valve 40 that is connected to the rinsing fluid line 95.

Further, the controller controls delivery of rinsing fluid and cleaning fluid into the second converter 10B, in a manner analogous to the control of delivery of rinsing fluid and cleaning fluid to the first converter 10A.

In operation, the controller is able to activate the cleaning fluid solenoid valve 40 to deliver heated cleaning fluid from the ring main 30 to the anilox roll 65 of the converter 10A within about 5 to 15 seconds of occurrence of a cleaning initiation condition at the controller.

In these about 5 to 15 seconds, the following takes place:

a first timed rinse of about 3 to 5 seconds of rinsing fluid is delivered to the anilox roll 65 by the controller activating rinsing fluid solenoid valve 45 in manifold 47 to connect the fluid line 95 to the fluid inlet 49 of the first printdown 60A;

a sequence comprising timed delivery of heated cleaning fluid to the anilox roll 65 commences. This sequence comprises activation by the controller of cleaning fluid solenoid 40 so that heated cleaning fluid travels from ring main 30 through the manifold 47 and along the piping external and internal to the converter, and to the anilox roll 65 of first printdown 60A. The sequence of heated cleaning fluid delivery may last for about 60 seconds, about 90 seconds, about 180 seconds or about 240 seconds, depending on whether the cleaning initiation condition recognised by the controller comprises a two-minute, four-minute, six-minute, or eight-minute controlled alternating timed delivery cycle. A four-minute cycle is described in more detailed below.

It is noted that heated cleaning fluid circulates around the ring main 30, as far as the manifold 47. Heated cleaning fluid likewise circulates as far as further manifolds, not shown, each respective further manifold being located adjacent to the boundary of the respective printdowns 60B, 60C and 60D.

The ring main 30 is located proximate to the converter 10A, to provide a short piping path having a length of about 1 to 2 meters for the heated cleaning fluid to travel between the manifold 47 and the fluid inlet 49 of the first printdown 60A of the converter 10A, the fluid inlet 49 comprising an existing rinsing fluid pipe in fluid connection to a cleanable part of the converter (i.e., the anilox roll 65), via internal piping in the converter 10A.

It will be understood that the short piping path for the converter 10A includes the length of piping past the heated cleaning fluid isolation valve 40, through the manifold 47 and to the fluid inlet 49.

The controller is configured to provide alternating timed delivery of the heated cleaning fluid and the rinsing fluid to the converters 10A, and 10B. In particular, the controller is configured to deliver about 3 to 5 seconds of rinsing fluid, then about 90 seconds of heated cleaning fluid, then a second rinse of about 90 to 120 seconds of rinsing fluid.

The controller, comprising a programmable logic controller is configured to recognise and respond to a cleaning initiation condition, and automatically execute activation of the two solenoid valves 40 and 45, and in particular, starting from a condition in which both solenoid valves 40 and 45 are closed, first opening the rinsing fluid solenoid valve 45 for about 5 to about 15 seconds to deliver rinsing fluid into the converter; then closing rinsing fluid solenoid valve 45 and opening the cleaning fluid solenoid valve 40 for about 90 seconds to deliver heated cleaning from the ring main 30 into the converter; and then closing cleaning fluid solenoid valve 40 and opening the rinsing fluid solenoid valve 45 for about 90 to 120 seconds to deliver a second rinse of rinsing fluid into the converter, after which time the rinsing fluid solenoid valve 45 is closed (i.e., both cleaning fluid and rinsing fluid valves 45, 40 are closed), completing the approximately four minute cleaning cycle.

In FIG. 1, the cleaning fluid is sourced from cleaning fluid container 80 which has a fluid connection to the heating unit 20, via the chemically resistant non-return valve 85 (i.e., the non-return valve is chosen to be resistant to degradation by the chemicals used in the cleaning fluid). In this embodiment, the cleaning fluid container contains a pre-diluted mixture of cleaning fluid and water.

The system 5 depicted in FIG. 1 includes an automatically controllable circulation pump 70 for circulating the heated cleaning fluid around the ring main. The circulation pump 70 is controllable by the controller to be inactive for at least 4 hours per 24-hour period. This provides for less degradation of the cleaning system 5, and in particular the circulation pump itself which is susceptible to degradation, as the system 5 is not continuously used over long periods of time. Providing a regular period where the cleaning system 5 is not in use also provides the benefit of downtime to perform any modifications or repairs to the cleaning system.

FIG. 1 depicts two converters, 10A and 10B, however it will be understood that the system may be adapted for cleaning more than two converters, including by extending the ring main 30, and adding any further manifolds.

Figure 2:
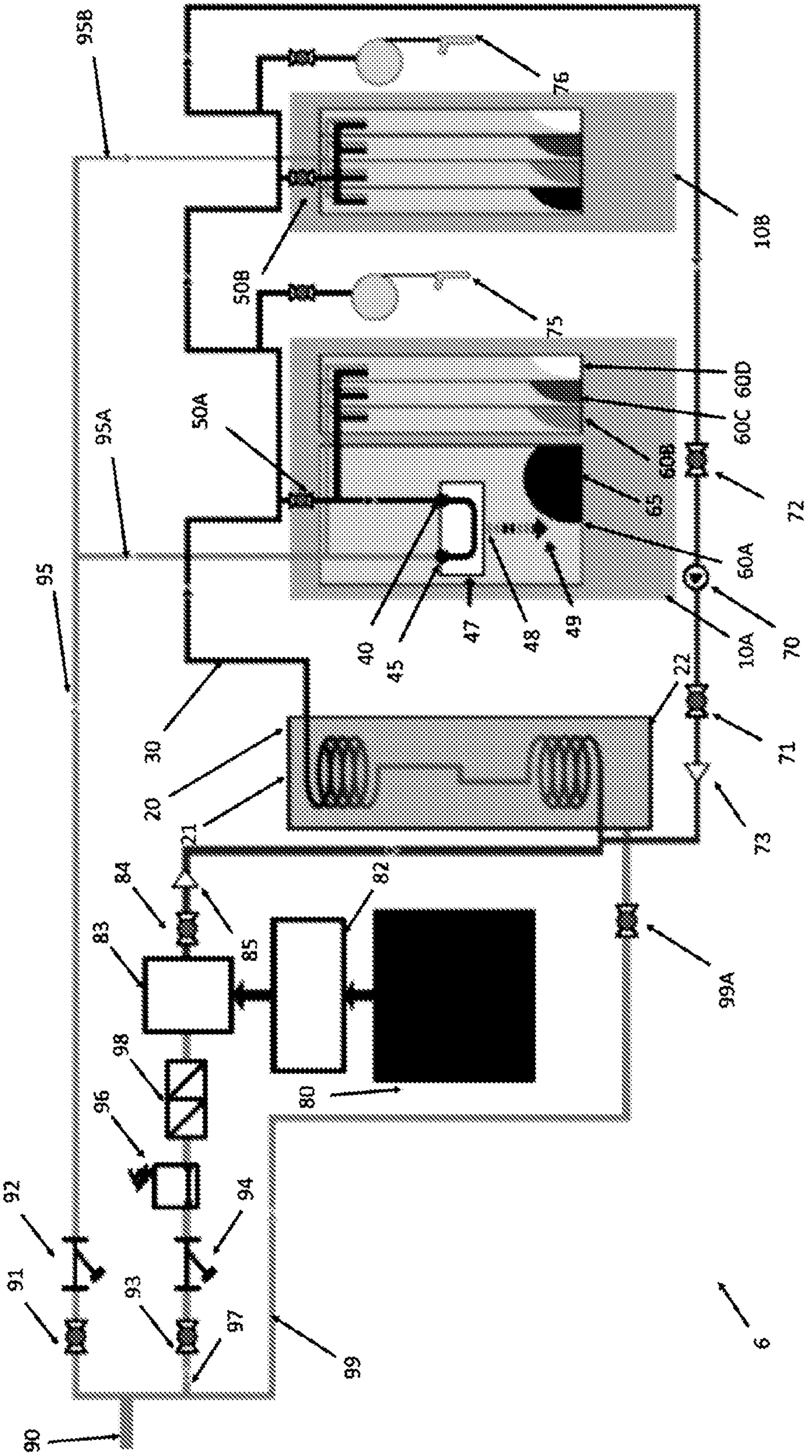
FIG. 2 is a schematic illustration of a system for cleaning a converter in accordance with another preferred embodiment of the present invention.

FIG. 2 shows a second illustrative embodiment of a system in accordance with the invention. The cleaning system 6 of FIG. 2 is substantially the same as the cleaning system 5 depicted in FIG. 1, but includes additional components which are described in detail below. It is noted that additional converters may be connected in line with converters 10A, 10B in accordance with the invention as described in this specification.

In FIG. 2, mains water supply 90 provides rinsing fluid source, a diluting fluid source via diluting fluid line 97, and a heat exchange fluid source via heat exchange fluid line 99. The pressure from the mains water supply assists in moving the fluid (including water acting as rinsing fluid, and the cleaning fluid later diluted with the water) along the lines of the system 6, including moving the fluids through the heat exchange unit 20, the ring main 30 (together with circulation pump 70) and into the converters 10A, 10B, as well as to produce foaming at the sprayers 75, 76 located around the ring main 30.

Water travels along rinsing fluid line 95, past isolation valve 91, and filter 92 then via water lines 95A, 95B onto each of the converters 10A, 10B, respectively, for delivery of rinsing fluid. The filter 92 is a 200 mesh Y strainer filter designed to prevent and capture foreign material entering past the strainer (for example, rust particles, excess pipe joining material, swarf from pipe cutting).

Diluting fluid line 97 includes isolation valve 93, filter 94, and pressure regulator 96 (set to 55 psi or less) for controlling pressure in the diluting fluid line 97 which is important to manage pressure peaks in the mains water supply which, if unregulated, may damage the diluter 83. Downstream of the pressure regulator 96 is a testable non-return valve 98 for ensuring that cleaning fluid is prevented from entering the mains water supply 90.

Downstream of the non-return valve 98 is a diluter 83, the diluter comprising a proportional dosing injector (e.g., MixRite) for proportional mixing of cleaning fluid (delivered to the diluter 83 via measuring unit 82) with the water (delivered to the diluter 83 from mains water supply source 90 along rinsing fluid line 97).

Measuring unit 82 is in fluid connection with the diluter 83 and cleaning fluid source 80 (described in relation to FIG. 1).

Diluting of cleaning fluid is performed at a ratio of approximately 1:50 or 1:65 with water.

Measuring unit 82 comprises an electronic volumetric flow meter connected to the container 80 and measures usage of the concentrated cleaning fluid in the container, and it is able to wirelessly communicate flow related data to a personal electronic computer (not shown) of a person/entity monitoring cleaning fluid usage. The flow measuring unit 82 includes data/event logging such that events comprising flow rates or refilling of the container will be time stamped and recorded in the unit. Measuring unit 82 also operates to identify leaks in the cleaning fluid lines or where cleaning fluid is separately removed from the cleaning fluid source 80 (e.g., via a tap at the bottom of the container). The data generated by the measuring unit is communicated by WiFi to the personal electronic computer by a microcontroller and a dedicated WiFi controller/module in the unit 82.

Additionally, FIG. 2 depicts sprayers 75, 76 for manual application of foamed diluted cleaning fluid to parts of the converters 10A, 10B or equipment used therewith. Each sprayer 75, 76 is connected to its own hose reel (e.g., a retractable garden hose type system) and further isolation valves for isolating those components (e.g., for cleaning, repairing or replacement).

Ring main 30 in FIG. 2 further includes isolation valves 71 and 72 to isolate circulation pump 70 (e.g., for cleaning, repair or replacement). Downstream of the isolation valve 72 is a further chemically resistant non-return valve to prevent unheated cleaning solution from the container 80 flowing into heated cleaning fluid circulating around the ring main 30.

An isolation valve 99A and non-return valve (not shown) is also provided near to the heat exchange fluid inlet of the heating unit 20 to provide for isolation of the that part of the heating unit 20 and to prevent heated heat exchange fluid (i.e., boiling water) existing the heating unit 20, respectively.

With regard to FIGS. 1 and 2, non-return valves and isolation valves (not shown) are also included in systems 5 and 6 along each water line 95A, 95B connecting the rinsing fluid line 95 to each of the converters to prevent backflow of water along each water line, and for isolating those elements of each system 5, 6.

Figure 3:
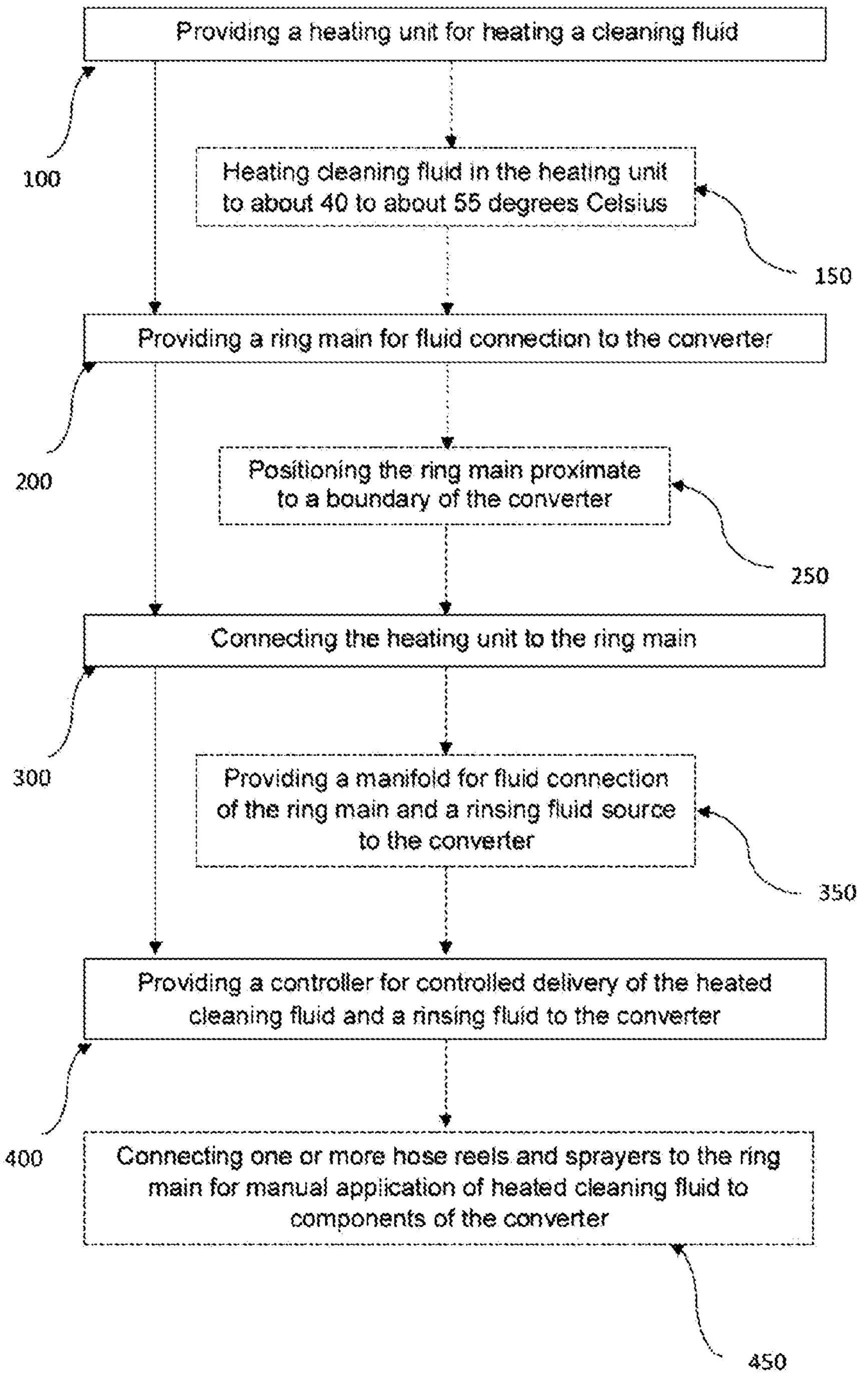
FIG. 3 is a flow diagram of the steps of a method for cleaning a converter, in accordance with a first illustrative method of the invention.

FIG. 3 is a flow chart of steps in an illustrative cleaning method of the invention. The method comprises four necessary steps, and four preferential steps (indicated by dashed lines). The necessary and preferential steps comprise:

First step 100 comprising providing a heating unit for heating a cleaning fluid; preferential step 150 comprises heating cleaning fluid in the heating unit to about 40 to about 55 degrees Celsius;

Second step 200 comprising providing a ring main for fluid connection to the converter; preferential step 250 comprises positioning the ring main proximate to a boundary of the converter;

Third step 300 comprising connecting the heating unit to the ring main; preferential step 350 comprises providing a manifold for fluid connection of the ring main and a rinsing fluid source to the converter; and Fourth step 400 comprising providing a controller for controlled delivery of the heated cleaning fluid and a rinsing fluid to the converter; where the preferential step 450 comprises connecting one or more hose reels and sprayers to the ring main for manual application of heated cleaning fluid to components of the converter.

Figure 4:
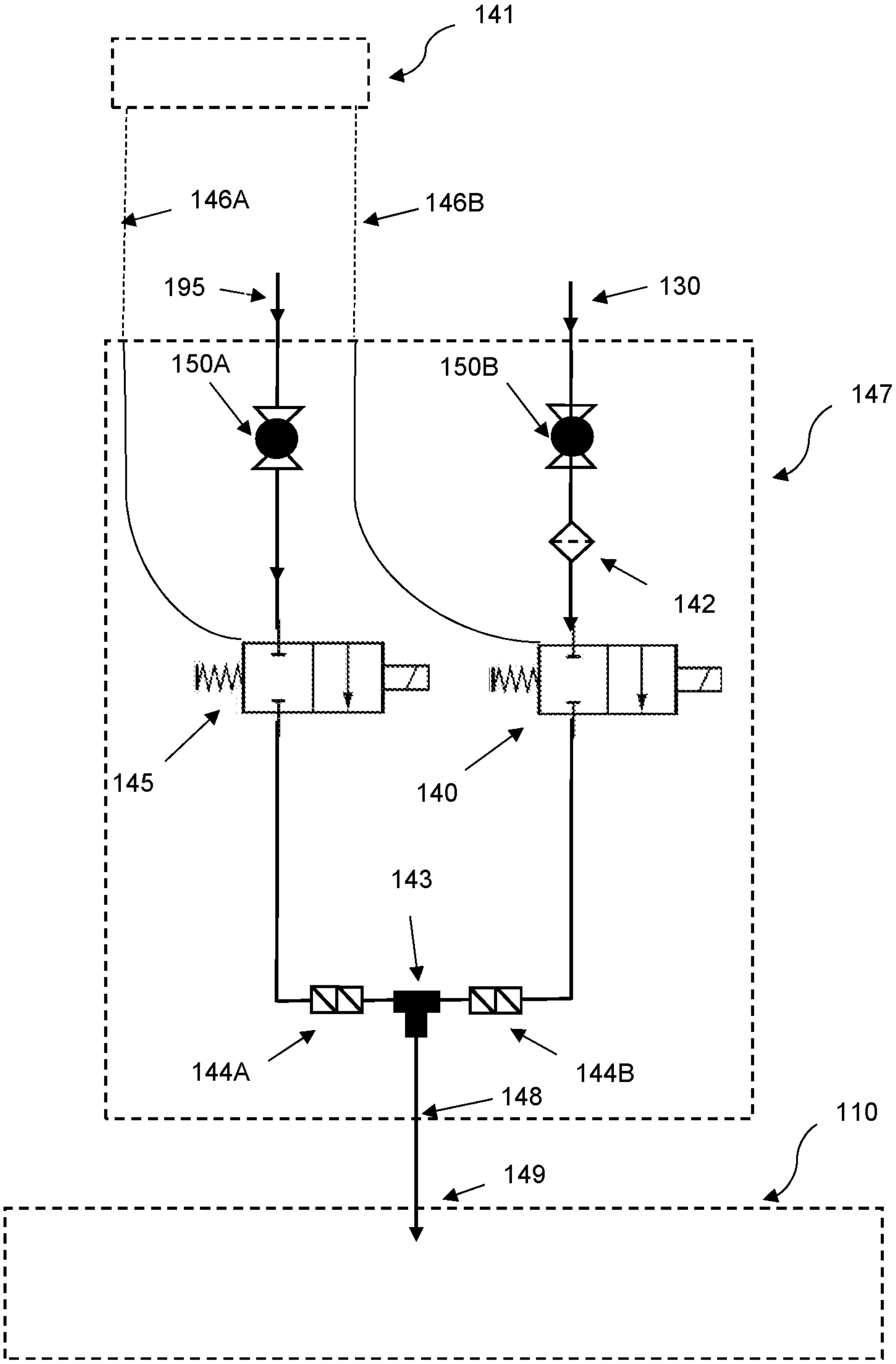
FIG. 4 is a schematic illustration of a manifold adapted for use with the present invention.

FIG. 4 is a schematic representation of manifold 147 that is located proximate to the boundary of converter 110, and that controls the delivery of rinsing fluid from rinsing fluid line 195 and the delivery of heated cleaning fluid from the ring main 130 to the converter 110. The outlet 148 of the manifold 147 is connected to a fluid inlet 149 of the converter 110.

The manifold 147 includes a first non-return check valve 144A to prevent flow of heated cleaning fluid into the rinsing fluid line 195. The manifold further includes a second non-return check valve 144B to prevent flow of rinsing fluid into the ring main 130.

The manifold 147 further includes two isolation valves 150A, 150B, one on each of the rinsing fluid line 195 and ring main 130, respectively. Isolation valves 150A, 150B are designed to allow isolation of the manifold from both the rinsing line and the ring main, to allow cleaning, repair, replacement etc. The outlet 148 of the manifold is disconnectable from the converter.

The manifold 147 includes two controllable solenoid valves 145, 140, one on each of the rinsing fluid line 195 and ring main 130, respectively. Controllable solenoid valves are responsive to a PLC controller 141 to control the delivery of rinsing fluid and heated cleaning fluid to the converter 110 in a timed alternating sequence. The heated/cleaning fluid therefore travels through the piping of the manifold 147 including tee section 143 and then into the converter 110, when the solenoid valves 140, 145 are activated.

Between solenoid valve 140 and isolation valve 150B there is provided a cleaning fluid filter 142, comprising a 200 mesh Y strainer.

PLC controller 141 is pre-programmed to send signals to each of the solenoid valves 145, 140 along PLC lines 146A and 146B. The controller 141 is located separate from the manifold, in a switch box for the converter 110, and may control multiple manifolds for multiple printdowns on the converter 110 (not shown on FIG. 4).

Figure 5A:
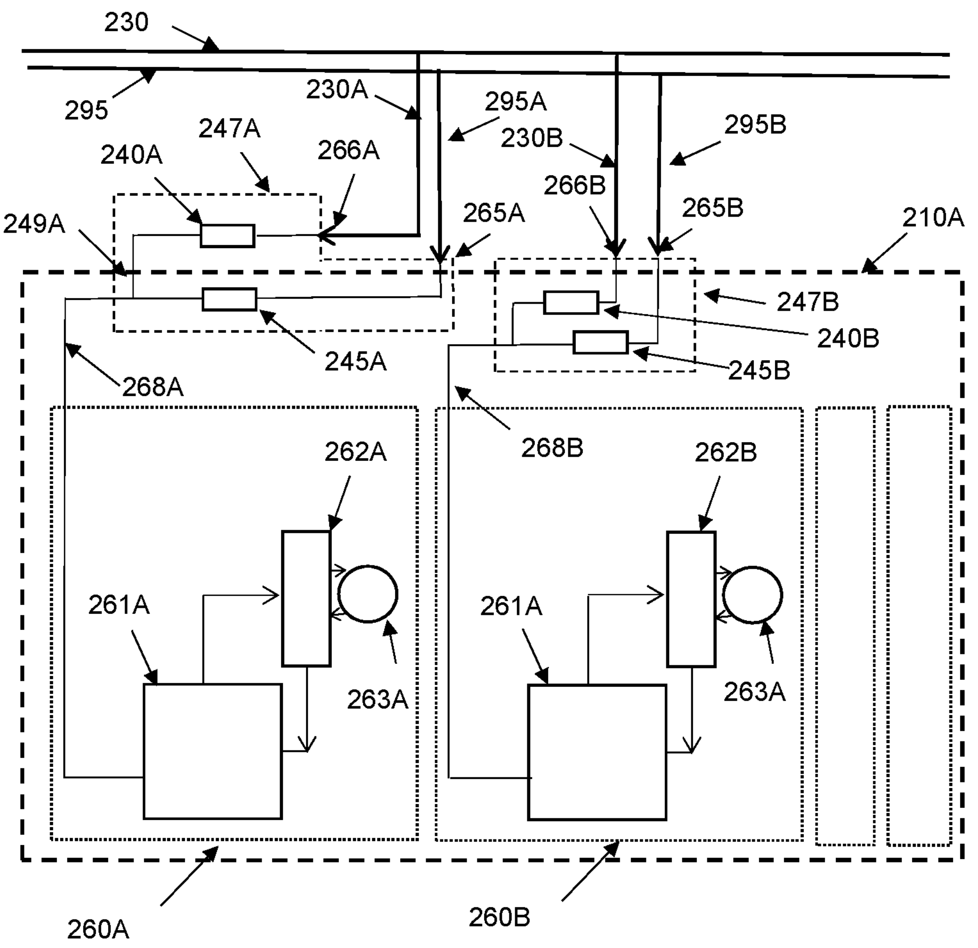
FIG. 5A is a schematic illustration of systems including first manifold and a second manifold for delivering heated cleaning fluid and rinsing fluid to a converter including cleanable components, in accordance with further preferred embodiments of the present invention.

FIG. 5A illustrates different two different manifold configurations on a single converter 210A. Manifold configurations would not usually vary between printdowns on the one machine, however, for convenience FIG. 5A shows both a first manifold 247A that is located partially within the boundary of the converter 210A, and a second manifold 247B that is effectively located completely within or at the boundary of the converter 210A. Both manifolds are located proximate to the boundary of the converter 210A, however in other configurations one or more of the existing converter controllable valves 245A, 245B, 240B may be located deeper within the converter 210A (e.g., further along the ink line 268A, 268B).

First and second manifolds 247A, 247B each have a rinsing fluid inlet 265A, 265B and a heated cleaning fluid inlet 266A, 266B, respectively connecting to the rinsing fluid line 295 and ring main 230 via rinsing fluid lines 295A, 295B and ring main lines 230A, 230B.

First manifold 247A includes a controllable heating fluid valve 240A that is located external to the converter 210A, and a rinsing fluid valve 245A that is located internal to the converter.

Second manifold 247B includes a controllable heating fluid valve 240B that is internal external to the converter 210A, and a rinsing fluid valve 245B that is located internal to the converter.

The set-ups of manifolds 247A and 248B contemplate scenarios where there is rinsing fluid line 295 is an existing line and rinsing fluid valves 245A, 245B are each existing rinsing valve reconfigured for use with the invention.

The cleaning system of the invention, in the case of manifold 247A, applies a retrofit single controllable valve—the heated cleaning fluid valve 240A. It also repurposes existing rinsing fluid inlet 265A, and adds the controllable valve 240A in line with the existing ink line inlet 249A (existing ink line inlet 249A remains able to receive ink).

The cleaning system of the invention, in the case of manifold 247B, also reconfigures existing valve 240B (i.e., an ink line valve) for connection to the ring main 230 (existing valve 240B is connected to an existing ink line, into which the ring main is teed—not shown on FIG. 5A).

In the case of manifold 247B, heated cleaning fluid inlet 266B is a repurposed existing ink line inlet to the converter, and inlet 265B is a repurposed existing rinsing fluid inlet.

It can therefore be understood that manifold 247B may comprise a component as little as a tee (or Y) section to connect the ring line 230 to the existing converter ink line inlet 266B. In set-ups such as that depicted in FIG. 5A, where the cleaning system or method of the invention comprises a retrofit system or retrofitting to an existing converter already including connection to a rinsing fluid line, then existing lines and valves controlling flow of rinsing fluid and/or ink may be retained and controlled by the controller.

Manifolds 247A, 247B therefore respectively connect to existing ink lines 268A, 268B, that are in fluid connection to other respective cleanable parts of each printdown 260A, 260B, namely the ink tray 261A, 261B, ink applicator 262A, 262B (which may be comprise an ink chamber and doctor blade, or an ink tray and fountain roll, for example), and anilox roll 263A, 263B.

Figure 5B:
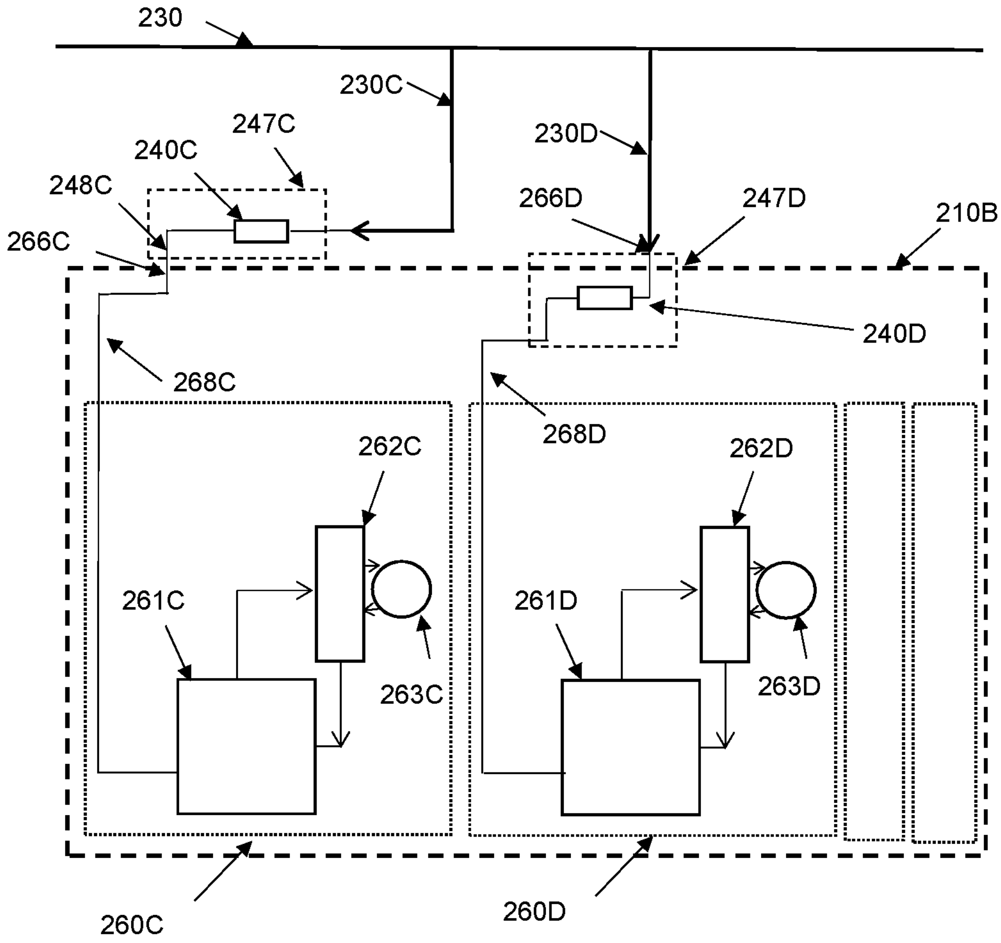
FIG. 5B is a schematic illustration of systems including first manifold and a second manifold for delivering heated cleaning fluid a converter including cleanable components, in accordance with further preferred embodiments of the present invention.

FIG. 5B depicts a similar cleaning system to that presented in FIG. 5A, except the rinsing fluid line and components associated with delivery of rinsing fluid in FIG. 5A are not present in FIG. 5B.

FIG. 5B depicts two manifolds 247C, 247D, each connected to ring main 230 via first line 230C and second line 230D, respectively.

Manifold 247C includes heated fluid solenoid valve 240C, where manifold outlet 248C is connected to the ink line inlet 266C of the printdown 260C on the converter 210B, for delivering heated cleaning solution along the ink line 268C and to cleanable converter components 261C, 262C and 263C. The manifold 247C is external to the converter 210B and attached nearby the boundary of the converter 210B.

Manifold 247D includes heated fluid solenoid valve 240D, which is a reconfigured existing ink valve of the printdown 260C, for delivering heated cleaning solution along the ink line 268D and to cleanable converter components 261D, 262D and 263D. The manifold 247D is internal to the converter 210B.

Both valves 240C and 240D in manifolds 247C, and 247D respectively, are controlled by a programmable controller (not shown in FIGS. 5A and 5B), for delivering heated cleaning fluid from the ring main 230 to each printdown 260C, 260D to the boundary of the converter 210B (and to the cleanable components) within a predetermined period of time. The programmable controller (not shown) is also configured to deliver heated cleaning fluid to the cleanable components for a predetermined amount of time.

It will be understood that features such as a rinsing fluid line, rinsing fluid valves internal to the converter, or other components associated with rinsing fluid delivery, while not depicted in FIG. 5B and not necessarily present in all embodiments of the invention, remain compatible with embodiments of the invention that do not specifically require them. For example, the invention may comprise a retrofit system that provides delivery of heated cleaning (from a ring main) to an existing converter, to supplement existing rinsing fluid delivery provided by existing components (e.g., exiting rinsing lines, and valves operated by an existing controller).

Figure 6:
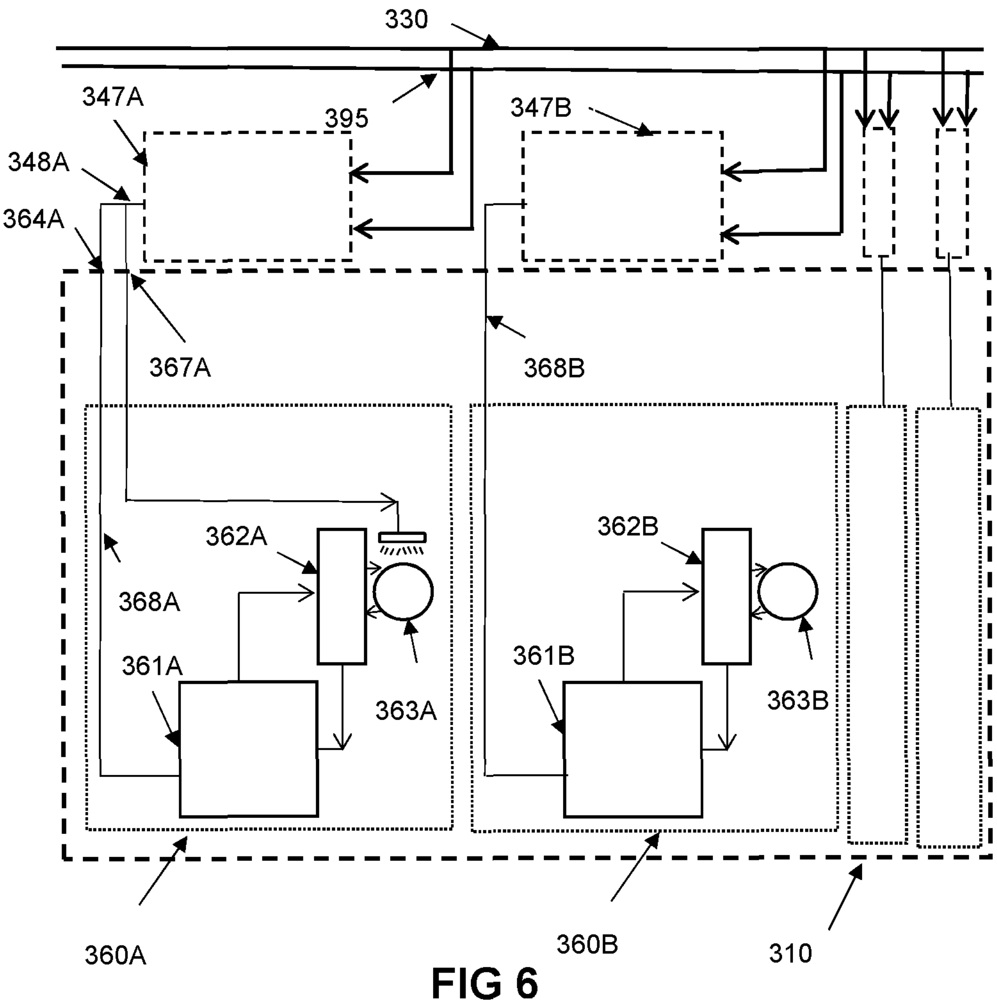
FIG. 6 is a schematic illustration of systems including plurality of manifolds connected to a converter including cleanable components, in accordance with further preferred embodiments of the present invention.

FIG. 6 illustrates different two different internal printdown configurations on a single converter 310, such that cleaning is performed differently on each printdown 360A, 360B. Internal configurations would not usually vary between printdowns on the one machine, but do so in FIG. 6 for illustrative purposes. Both manifolds 347A, 347B are located proximate to the boundary of the converter 310, and each are connected to the rinsing fluid line 395 and the ring main 330. The internals of the manifolds 347A, 347B are not shown in FIG. 6, nor described in detail with reference to FIG. 6 as each manifold can be taken to have the same internal configuration as that depicted in FIG. 4.

The outlet 348A of manifold 347A connects to twin inlets 364A, 367A comprising, respectively, an existing ink line inlet 364A and a direct anilox roll cleaning inlet 367A for printdown 360A on the converter 310.

In the configuration on printdown 360A, therefore, manifold 347A is adapted to provide a sequence of heated cleaning fluid and rinsing fluid to ink line 368A, to clean further cleanable parts comprising ink tray 361A, applicator 362A and anilox roll 363A as the rinsing and cleaning fluid travels around the ink circuit around those cleanable parts before leaving the tray 361A via drain (not shown). Manifold 347A further provides for direct cleaning of the anilox roll 363A via existing direct anilox roll rinsing fluid inlet 367A, the latter being reconfigured to be connected to the manifold outlet 348A. In this manner, more thorough cleaning of the anilox roll 363A may be achieved.

In the configuration on second printdown 360B, manifold 347B is adapted to provide a sequence of rinsing fluid and heated cleaning fluid to ink line 368B, to clean further cleanable parts comprising ink tray 361B, applicator 362B and anilox roll 363B as the rinsing and cleaning fluid travels around the ink circuit and around those cleanable parts before leaving the tray 361B via drain (not shown).

Figure 7:
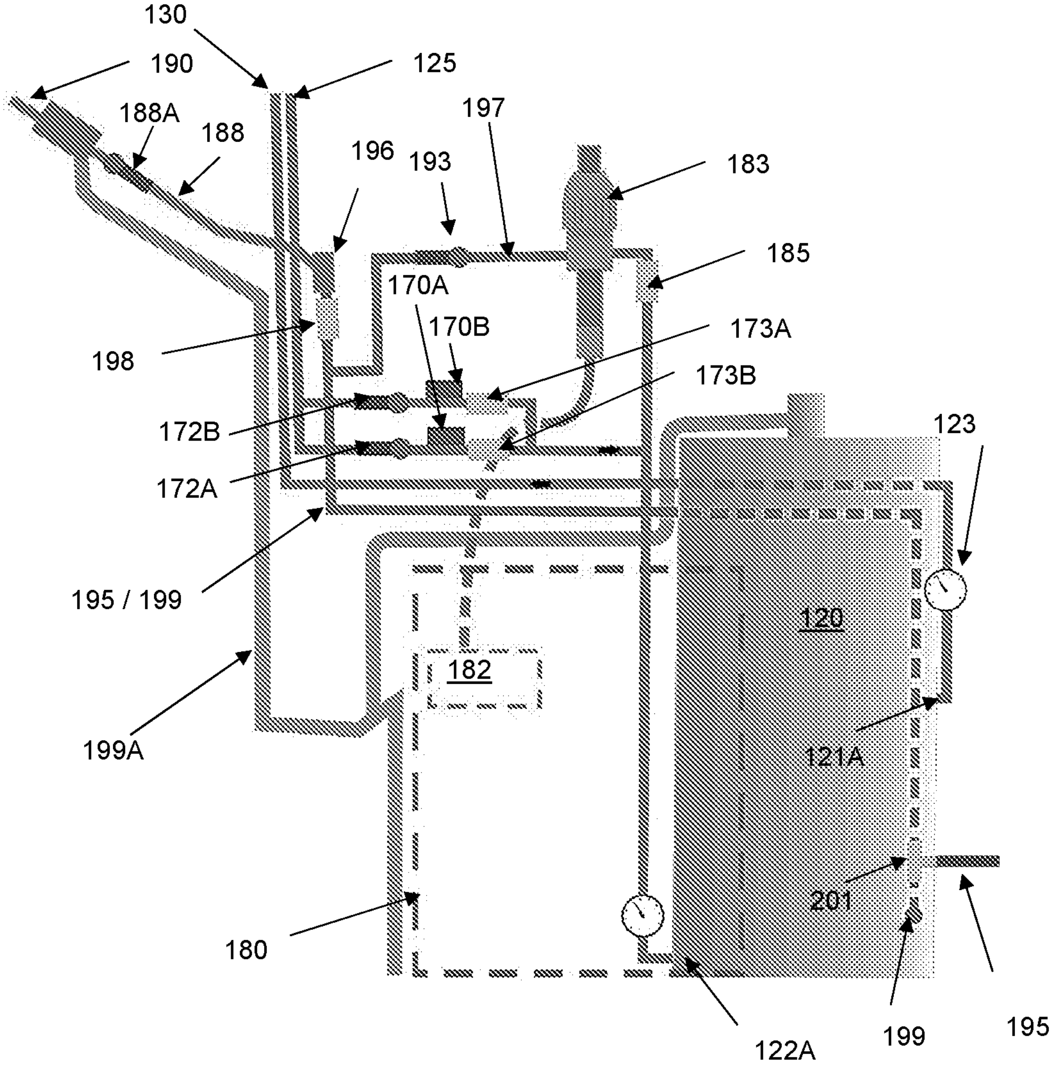
FIG. 7 is a schematic illustration of the heat exchanger unit and associated components as part of a system for cleaning a converter in accordance with a preferred embodiment of the invention.

FIG. 7 depicts a set-up of a heat exchange unit 210 and associated system piping and plumbing. Tote 180 including the cleaning fluid concentrate is connected to measuring unit 182 (e.g., a Bintech unit), each of which are shown in dashed lines as they are located behind a wall in the represented set-up.

Measuring unit 182 is connected to diluter 183, the latter including connection to diluting fluid line 197 and the heat exchange unit 120, so that rinsing fluid is diluted prior to entry into the heat exchange unit 120.

The mains water supply 190 supplies feed line 188, which in turn supplies:

the diluting fluid line 197, the rinsing fluid and the heat exchanger fluid line 195/199, which later splits into the rinsing fluid line 195 and heat exchanger fluid line 199 at duo valve 201.

Water feed line 188 further includes a pressure limiting valve 196 to regulate pressure of the fluid through the diluter 183, the heat exchanger fluid line 199 and through the rinsing line 195. An isolation valve 188A is able to isolate the mains supply 190 from the feed line 188.

An isolation valve 193 is able to isolate the diluter 183 from the water feed line 188.

Heat exchange unit 20 is connected to the diluter 183 at inlet 122A to receive a cold diluted mixture of water and cleaning fluid. Once the heating fluid reaches heat exchanger outlet 121A it is at a temperature of about 38 degrees. This may be monitored by the temperature gauge 123. The heated cleaning fluid then travels along cleaning fluid line 130 to the converters.

Twin circulation pumps 170A, 170B are located in parallel on the returning section 125 of heated cleaning fluid line 130, so that each pump runs for alternating 12 hour, or shorter, blocks of time for continuous circulation of the heated cleaning fluid around the ring main. This provides an opportunity for one of the circulation pumps 170A, 170B to cool and/or be maintained or repaired, while the other one is running.

A number of isolation and non-return valves are included, for reasons that have been described elsewhere in the specification, including:

Non return valves 173A, 173B on the cleaning fluid return line 125

Non return valve 198 next to pressure regulator 198

Non return valve 185 between the diluter 183 and heat exchanger inlet 122A Isolation valves 172A and 172B to isolate the circulation pumps 170A, 170B.

Figure 8:
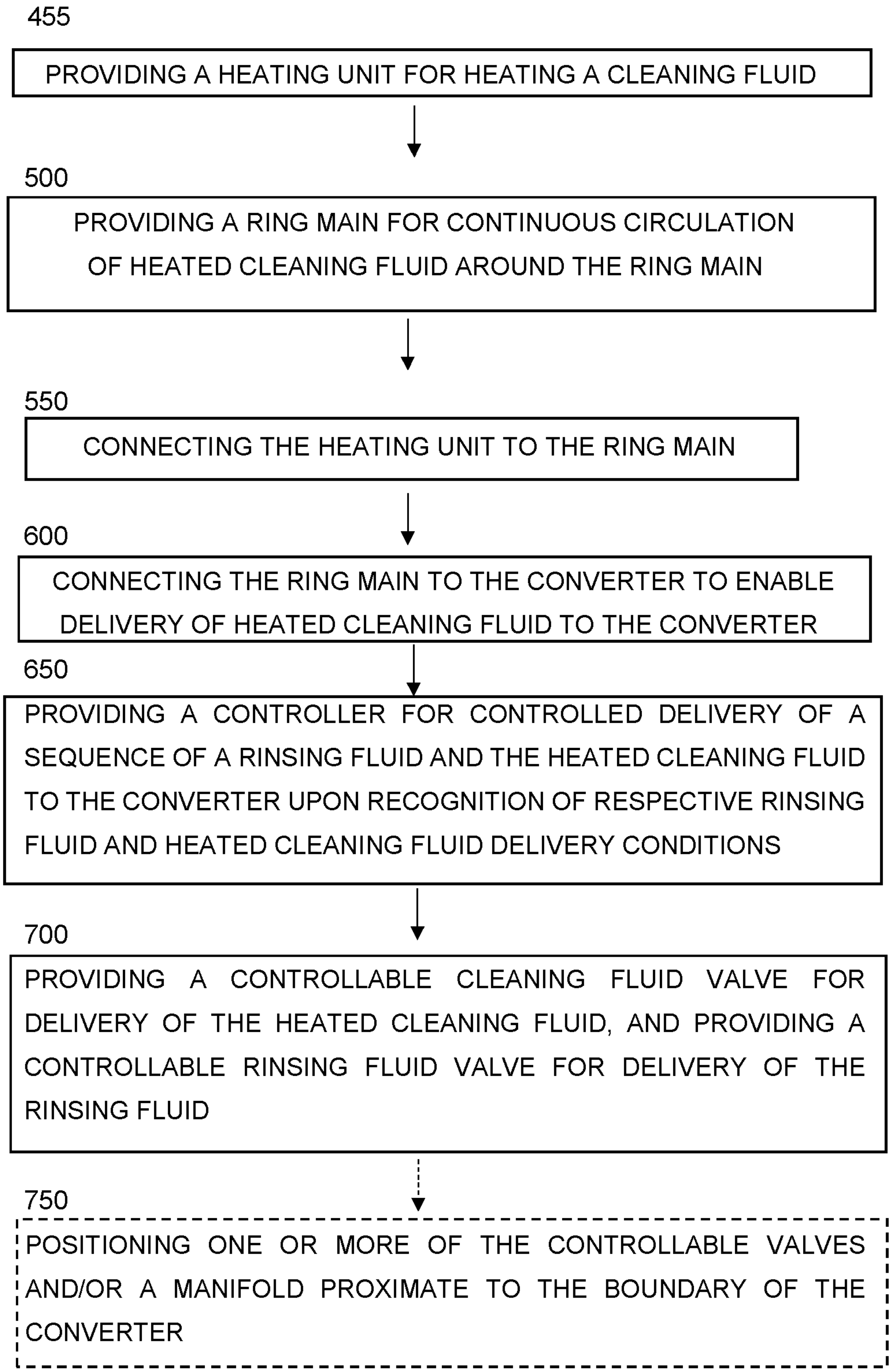
FIG. 8 is a flow diagram of the steps of a method for cleaning a converter, in accordance with a second illustrative method of the invention.

FIG. 8 is a flow chart of steps in an illustrative cleaning method of the invention. The method comprises six necessary steps, and one preferential step (indicated by dashed lines). The necessary and preferential steps comprise:

A first step 455: providing a heating unit for heating a cleaning fluid;

A second step 500: providing a ring main for continuous circulation of heated cleaning fluid around the ring main;

A third step 550: connecting the heating unit to the ring main;

A fourth step 600: connecting the ring main to the converter to enable delivery of heated cleaning fluid to the converter;

A fifth step 650: providing a controller for controlled delivery of a sequence of a rinsing fluid and the heated cleaning fluid to the converter upon recognition of respective rinsing fluid and heated cleaning fluid delivery conditions;

A sixth step 700: providing a controllable cleaning fluid valve for delivery of the heated cleaning fluid, and providing a controllable rinsing fluid valve for delivery of the rinsing fluid; and optionally A seventh step 750: positioning the one or more controllable valves and/or a manifold proximate to the boundary of the converter.

Figure 9:
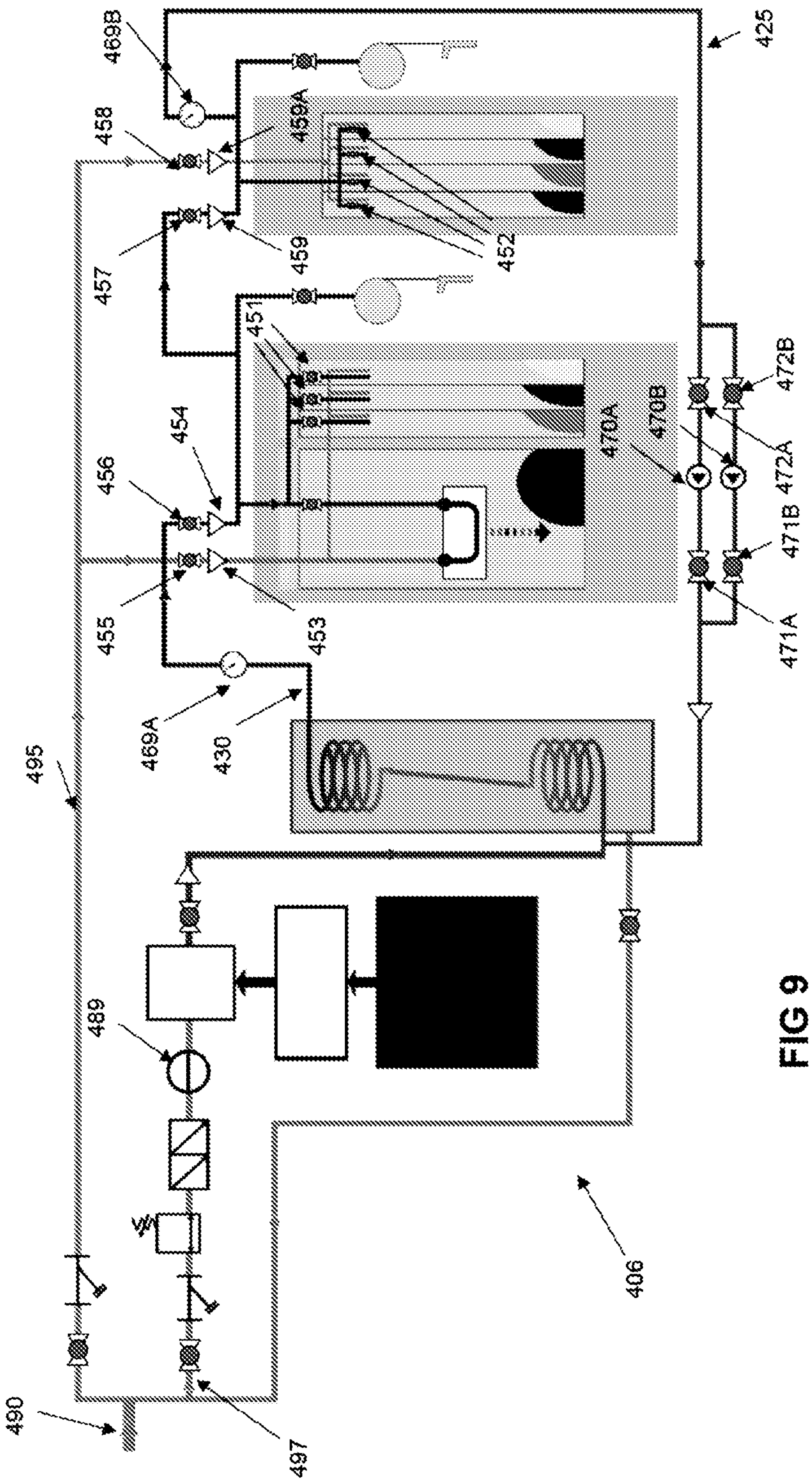
FIG. 9 is a schematic illustration of a system for cleaning a converter in accordance with a further preferred embodiment of the present invention.

FIG. 9 illustrates a cleaning system 406 that is substantially the same as system 6 of FIG. 2, except that it includes the following additional components:

a) Circulation pumps 470A and 470B for circulating heated cleaning fluid along the ring main 430 including through the return section 425.

b) Isolation valves 455 and 458 for isolating the rinsing fluid line 495 from each converter c) Isolation valves 456 and 457 for isolating the ring main 430 from each converter d) Isolation valves 451 and 452 for isolating individual printdowns e) Isolation valves 471A, 471B, 472A, 472B for isolating circulation pumps 470A and 470B f) Non return valves 453, 454 and 459, 459A for preventing cross contamination of heated cleaning fluid and rinsing fluid lines g) Water softening unit 489 h) Temperature gauges 469A and 469B for reading the temperature of heated cleaning fluid as it exits the heat exchanger, and when it starts to return back to the heat exchanger along the return section 425.

Apart from components such as mains water supply 490 and ring main 430, only the additional components that are not present FIG. 2 are identified on FIG. 9.

With reference to FIGS. 4 and 9, non-return valves 144A, 144B on the manifold, as well as non-return valves on each line coming into the converters 453, 454, 459, 459A, and isolation valves 455, 456, 457, 458 before the non-return valves operate to fully isolate the converters. There is an excess of non-return valves to ensure no cleaning fluid can leak back into the rinsing fluid lines and that diluted cleaning solution cannot find its way back into the cleaning solution supply (e.g., tote).

To further understand the role and application of the additional components in FIG. 9 and referred to above, including the twin circulation pumps, isolation valves and non-return valves, reference is made to systems of the invention described in detailed elsewhere in the specification.

Water softening unit 489 is a further filter optionally included to remove calcium, magnesium, and/or other metal cations if the mains water supply 490 supplies hard water, with a result of softer water requiring less cleaning fluid for the same cleaning effort (where cleaning fluid is not wasted bonding with the metal cations). Water softening unit 489 also extends the lifetime of the piping and fittings in the system 406 by reducing or eliminating scale build-up in pipes and fittings. In alternative embodiments, where it is practical, a single water softening unit may be placed next to the mains water supply 490, before splitting of diluting fluid line 497 and rinsing fluid line 495, so that water supplied along diluting fluid line 497 and rinsing fluid line 495 is softened by that single water softening unit.

The invention thus provides an automatic heated cleaning system and method which helps maintain a converter in an optimal state without significant labour costs and preventing ink buildup. Particularly, the use of heated cleaning fluid, which is available instantaneously (while the system or method is operating) provides a substantially improved cleaning due to the heated cleaning fluid operating more effectively to clean the ink from the converter. It will be understood by the person skilled in the art that an increase in temperature of approximately 10 degrees will approximately double (or substantially improve) the effectiveness of the cleaning fluid and approximately halve (or substantially reduce) the time taken for the cleaning fluid to effectively clean. Therefore, the increased temperatures for cleaning fluid provided by the invention of up to about 40 degrees (or potentially higher, subject to internal converter piping), are able to deliver two, four or even higher efficiency multiples, depending on the temperatures under which a comparable unheated cleaning method or system operates.

It can be seen that one or more of the following benefits may be delivered by the proposed invention: gains in production time; gains in time for maintenance; improved printing quality; a reduction in water or cleaning fluid usage by significant percentages; a reduction in the cost of waste water processing and the cost of water used; reduction in the need to replace and/or manually repair or clean equipment, and in particular anilox rolls, ink chambers, and piping in a converter.

Interpretation

Persons skilled in the art will appreciate that many variations may be made to the invention without departing from the scope of the invention, which is determined from the broadest scope and claims.

The methods and/or systems of the invention may be applied in new machines used in the printing industry. In particular, the method and/or system of the invention, or a part of the method and/or system, may be applied in a new converter installation where new converters incorporating the essential features of the invention, include connection to the ring main, are installed as new.

However, the systems and/or methods of the invention are particularly suited to retrofit application to existing equipment including a converter and related components. The invention is able to clean ink residue or other ink deposits from components such as anilox rolls, ink chambers, ink lines, and other equipment referred to herein.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly, it should be appreciated that in the above description of example embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some, but not other features included in other embodiments, combinations of features of different embodiments are meant to be within the scope of the invention, and form different embodiments, as would be understood by those in the art. For example, in the following claims, any of the claimed embodiments can be used in any combination.

The terms in the claims have the broadest scope of meaning they would have been given by a person of ordinary skill in the art as of the relevant date.

Neither the title nor any abstract of the present application should be taken as limiting in any way the scope of the claimed invention Where the preamble of a claim recites a purpose, benefit, or possible use of the claimed invention, it does not limit the claimed invention to having only that purpose, benefit or possible use.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value, unless the context indicates otherwise. For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that each unit between two particular units are also disclosed. For example, if 10 and 15 are disclosed, then 11, 12, 13, and 14 are also disclosed.

Different Instances of Objects

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

Specific Details

In the description provided herein, numerous specific details are set forth. However, it is understood that embodiments of the invention may be practiced without these specific details. In other instances, well-known methods, structures, and techniques have not been shown in detail in order not to obscure an understanding of this description.

Terminology

Where two or more valves performing different roles are referred to, one valve may nevertheless be used to carry out dual roles. For example, a single two way automatically controllable valve (or three way automatically controllable valve) valve can automatically controllable valve delivery of both cleaning fluid and rinsing fluid.

Where the term "sequence" is used in relation to a sequence of applications of rinsing fluid and cleaning fluid, it may mean only one application of rinsing fluid and one application of cleaning fluid, however it may also include more than one application of the rinsing fluid and/or cleaning fluid.

In describing the preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar technical purpose. Terms such as "forward", "rearward", "radially", "peripherally", "upwardly", "downwardly", and the like are used as words of convenience to provide reference points and are not to be construed as limiting terms.

The terms "a" and "an" mean "one or more", unless expressly specified otherwise.

In the present specification, terms such as "part", "component", "means", "section", or "segment" may refer to singular or plural items and are terms intended to refer to a set of properties, functions or characteristics performed by one or more items having one or more parts. It is envisaged that where a "part", "component", "means", "section", "segment", or similar term is described as consisting of a single item, then a functionally equivalent object consisting of multiple items is considered to fall within the scope of the term, and similarly, where a "part", "component", "means", "section", "segment", or similar term is described as consisting of multiple items, a functionally equivalent object consisting of a single item is considered to fall within the scope of the term. The intended interpretation of such terms described in this paragraph should apply unless the contrary is expressly stated, or the context requires otherwise The term "connected" or a similar term, should not be interpreted as being limitative to direct connections only. Thus, the scope of the expression an item A connected to an item B should not be limited to items or systems wherein an output of item A is directly connected to an input of item B. It means that there exists a path between an output of A and an input of B which may be a path including other items or means. "Connected", or a similar term, may mean that two or more elements are either in direct physical or electrical contact, or that two or more elements are not in direct contact with each other yet still co-operate or interact with each other.

Comprising and Including

In the claims which follow and in the preceding description of the invention, except where the context requires otherwise due to express language or necessary implication, the word "comprise" or variations such as "comprises" or "comprising" are used in an inclusive sense, i.e. to specify the presence of the stated features but not to preclude the presence or addition of further features in various embodiments of the invention.

Any one of the terms: including or which includes or that includes as used herein is also an open term that also means including at least the elements/features that follow the term, but not excluding others. Thus, including is synonymous with and means comprising.

SCOPE OF INVENTION

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

Although the invention has been described with reference to specific examples, it will be appreciated by those skilled in the art that the invention may be embodied in many other forms.

INDUSTRIAL APPLICABILITY

It is apparent from the above, that the arrangements described are applicable to the printed material and/or box manufacturing industries.

The invention claimed is:

1. A method of cleaning ink from components of a converter configured for manufacture of printed material, the method including the steps of:

providing a supply of a cleaning fluid;

providing a supply of a rinsing fluid;

providing a heating unit for heating the cleaning fluid to form a heated cleaning fluid;

providing a heated cleaning fluid transport circuit extending around the converter for continuous circulation of the heated cleaning fluid around the converter;

providing a rinsing fluid transport line for delivery of the rinsing fluid to the converter, said rinsing fluid transport line providing a flow path for the rinsing fluid to flow to the converter, the flow path being separate to the heated cleaning fluid transport circuit;

connecting the heating unit to the heated cleaning fluid transport circuit;

connecting the heated cleaning fluid transport circuit to the converter to enable delivery of the heated cleaning fluid to the converter;

providing a controllable heated cleaning fluid valve for delivery of the heated cleaning fluid to the converter, and providing a controllable rinsing fluid valve for delivery of the rinsing fluid to the converter;

providing a controller for recognizing a rinsing fluid delivery condition and a heated cleaning fluid delivery condition and for controlling delivery of a sequence of the rinsing fluid and the heated cleaning fluid to the converter;

wherein the heated cleaning fluid is continuously circulated through the heated cleaning fluid transport circuit to be continuously available for delivery to the converter while the converter is operating; and wherein the heated cleaning fluid transport circuit is positioned proximate to the converter such that the heated cleaning fluid is able to be delivered to the converter within a predetermined time after the controller recognizes the heated cleaning fluid delivery condition.

2. The method of claim 1, wherein the rinsing fluid is delivered to a cleanable part of the converter within a predetermined time after the controller recognizes the rinsing fluid delivery condition, and the controller is configured to deliver heated cleaning fluid from the heated cleaning fluid transport circuit to the cleanable part of the converter within a range of about 1 second to about 60 seconds after recognition of the heated cleaning fluid delivery condition.

3. The method of claim 1, wherein one or more of the heated cleaning fluid transport circuit, the controllable heated cleaning fluid valve and the controllable rinsing fluid valve is positioned to be proximate to a boundary of the converter, and the controller is configured to deliver heated cleaning fluid from the heated cleaning fluid transport circuit to the boundary of the converter within a range of about 1 second to about 30 seconds after recognition of the heated cleaning fluid delivery condition.

4. The method of claim 2, wherein after an initial occurrence of a rinsing fluid delivery condition, the controller is able to operate the controllable rinsing fluid valve to provide an initial delivery of rinsing fluid to the cleanable part of the converter for about 2 seconds to about 4 seconds.

5. The method of claim 1, wherein the controllable heated cleaning fluid valve and the controllable rinsing fluid valve comprise a single controllable valve.

6. The method of claim 1, wherein delivery of the heated cleaning fluid and the rinsing fluid includes delivery of the heated cleaning fluid and the rinsing fluid to a fluid inlet of the converter, the fluid inlet being in fluid connection with the converter; and the fluid inlet is able to receive heated cleaning fluid from the heated cleaning fluid transport circuit and rinsing fluid from a rinsing fluid source.

7. The method of claim 3, wherein the converter is connected to a rinsing fluid line for supplying the rinsing fluid to the converter and the method includes the step of providing a manifold including one or both of the controllable heated cleaning fluid valve and the controllable rinsing fluid valve for fluid connection of both of the heated cleaning fluid transport circuit and the rinsing fluid line to a fluid inlet of the converter; and the manifold is located proximate to the boundary of the converter or inside the converter.

8. The method of claim 1, wherein the method includes the step of heating cleaning fluid in the heating unit to a temperature in a range of about 35 degrees Celsius to about 40 degrees Celsius.

9. The method of claim 1, wherein:

the heating unit includes an outlet for introducing heated cleaning fluid into the heated cleaning fluid transport circuit and an inlet for receiving cleaning fluid that has circulated around the heated cleaning fluid transport circuit;

the heating unit inlet is connectable to a cleaning fluid source;

the method includes providing a diluter and the cleaning fluid source comprises a container of concentrated cleaning solution, the container being in fluid connection to the diluter for diluting the concentrated cleaning solution with a diluting fluid; and the diluting fluid is supplied from a diluting fluid source, and the diluting fluid source is the same source as a rinsing fluid source for supplying the rinsing fluid.

10. A system of cleaning ink from components of a converter configured for manufacture of a printed material, the system including:

a heated cleaning fluid transport circuit for fluid connection to the converter, the heated cleaning fluid transport circuit extending around the converter and positioned proximate to the converter;

a rinsing fluid transport line for delivery of a rinsing fluid to the converter, said rinsing fluid transport line providing a flow path for the rinsing fluid to flow to the converter, the flow path being separate to the heated cleaning fluid transport circuit;

a heating unit for heating a cleaning fluid to form a heated cleaning fluid, the heating unit being connected to the heated cleaning fluid transport circuit to enable continuous circulation of the heated cleaning fluid around the heated fluid transport circuit, and to enable continuously available delivery of the heated cleaning fluid to the converter while the converter is operating; and a controller configured to detect a heated cleaning fluid delivery condition and a rinsing fluid delivery condition and to provide controlled delivery of the heated cleaning fluid from the heated cleaning fluid transport circuit and the rinsing fluid from the rinsing fluid transport line to a cleanable part of the converter.

11. The system of cleaning ink according to claim 10, wherein the controller delivers heated cleaning fluid from the heated cleaning fluid transport circuit to a cleanable part of the converter within a range of about 1 second to about 60 seconds after the detection of the heated cleaning fluid delivery condition.

12. The system of claim 4, wherein:

the system includes a controllable heated cleaning fluid valve for delivery of the heated cleaning fluid, and a controllable rinsing fluid valve for delivery of the rinsing fluid; and after an initial occurrence of the rinsing fluid delivery condition, the controller operates the controllable rinsing fluid valve to provide a delivery of rinsing fluid to the cleanable part of the converter for about 2 seconds to about 4 seconds.

13. The system according to claim 12, wherein the controllable heated cleaning fluid valve and the controllable rinsing fluid valve comprise a single controllable valve.

14. The system according to claim 12, wherein delivery of heated cleaning fluid and rinsing fluid includes delivery of the heated cleaning fluid and the rinsing fluid to a fluid inlet of the converter, the fluid inlet being in fluid connection to the cleanable part of the converter; and the fluid inlet is a rinsing fluid inlet and a heated cleaning fluid inlet that is able to receive both heated cleaning fluid from the heated cleaning fluid transport circuit and rinsing fluid from a rinsing fluid source.

15. The system according to claim 12, wherein the system includes a manifold including one or both of the controllable heated cleaning fluid valve and the controllable rinsing fluid valve for fluid connection of both the heated cleaning fluid transport circuit and the rinsing fluid line to a fluid inlet of the converter, and the manifold is located proximate to a boundary of the converter or inside the converter.

16. The system according to claim 15, wherein the manifold includes a dual inlet valve having an output that is in fluid connection to the fluid inlet of the converter, wherein a first inlet of the dual inlet valve is in fluid connection to the heated cleaning fluid transport circuit and a second inlet of the dual inlet valve is in fluid connection to the rinsing fluid line.

17. The system according to claim 10, wherein the heating unit comprises a heat exchanger configured for heating cleaning fluid in the heating unit to a temperature in a range of about 35 degrees Celsius to about 40 degrees Celsius.

18. The system according to claim 10, wherein:

the heating unit includes an outlet for introducing the heated cleaning fluid into the heated cleaning fluid transport circuit and an inlet for receiving the heated cleaning fluid that has circulated around the heated cleaning fluid transport circuit;

the heating unit inlet is connectable to a cleaning fluid source;

the system further comprises a diluter and the cleaning fluid source comprises a container of concentrated cleaning solution, the container being in fluid connection to the diluter for diluting the concentrated cleaning solution with a diluting fluid;

the diluting fluid is supplied from a diluting fluid source, and the diluting fluid source is the same source as a rinsing fluid source.

* * * * *